(12) United States Patent
Hirayama et al.

(10) Patent No.: US 6,778,754 B1
(45) Date of Patent: Aug. 17, 2004

(54) OPTICAL FIBER WIRING APPARATUS AND OPTICAL FIBER WIRING METHOD

(75) Inventors: Mamoru Hirayama, Ibaraki-ken (JP); Koichi Arishima, Mito (JP); Tsuneo Tamagaki, Ebina (JP); Masayuki Sasaki, Chigasaki (JP); Chikao Nakagawa, Chigasaki (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 0 days.

(21) Appl. No.: 09/593,803

(22) Filed: Jun. 15, 2000

(30) Foreign Application Priority Data

Jun. 17, 1999 (JP) ............................................. 11-171671

(51) Int. Cl.[7] ................................................. G02B 6/00
(52) U.S. Cl. ......................... 385/147; 385/14; 156/158; 156/166
(58) Field of Search .............................. 385/14, 51, 52, 385/147; 156/158, 159, 166, 60

(56) References Cited

U.S. PATENT DOCUMENTS

| | | |
|---|---|---|
| 4,450,623 A | 5/1984 | Burr |
| 5,259,051 A | 11/1993 | Burack et al. |
| 5,365,657 A | 11/1994 | Brown et al. |
| 5,421,930 A | 6/1995 | Holland |

FOREIGN PATENT DOCUMENTS

| | | |
|---|---|---|
| JP | 5-37819 | 5/1993 |
| JP | 07-146412 | 6/1995 |
| JP | 09-197228 | 7/1997 |
| JP | 11-037764 | 2/1999 |
| JP | 11-119034 | 4/1999 |

*Primary Examiner*—Hemang Sanghavi
*Assistant Examiner*—Juliana K. Kang
(74) *Attorney, Agent, or Firm*—Thelen Reid & Priest, LLP

(57) ABSTRACT

A wiring substrate; a wiring head which guides optical fibers to the lead end thereof and forms an optical fiber path; an optical fiber feed mechanism which feeds the optical fiber into the optical fiber path; an optical fiber contact mechanism which brings the optical fiber, which has been guided to the lead end of the wiring head, and the wiring substrate into contact; an XY movement mechanism, which moves the wiring substrate and the wiring head relative to one anther in the X and Y directions; and an optical fiber affixing mechanism which successively affixes, to the wiring substrate, the optical fiber which has been brought into contact with the wiring substrate during movement by the XY movement mechanism; are provided.

A wiring method which conducts the wiring of an optical fiber onto a wiring substrate, wherein the feeding of this optical fiber is adjusted by an optical fiber feed mechanism so that the tension thereof is within a fixed range, this optical fiber is wired onto the wiring substrate by a wiring mechanism, and the optical fiber is cut to the length required for the wiring by the optical fiber cutting mechanism.

23 Claims, 13 Drawing Sheets

MOVEMENT IN THE DIRECTION OF THE WIRING → CROSS-SECTION

DOWNWARD MOVEMENT

| PRESSURE G OF WIRING HEAD | WIRING NUMBER | FREQUENCY OF PATTERN FAILURE |
|---|---|---|
| $9.8 \times 10^{-2}$ (N) (10gf) | 10 | 0 |
| $1.9 \times 10^{-1}$ (N) (20gf) | 10 | 0 |
| 1.3 (N) (130gf) | 10 | 0 |
| 2.0 (N) (200gf) | 10 | 0 |
| 2.2 (N) (230gf) | 10 | 2 |

OPTICAL FIBER WIRING APPARATUS AND OPTICAL FIBER WIRING METHOD

BACKGROUND OF THE INVENTION

1. Technical Field of the Invention

The present invention relates to a manufacturing apparatus for optical fiber wiring boards.

The present specification is based on a Japanese patent application (Japanese Patent Application No HEI 11-171671), and the contents of this Japanese Patent Application are incorporated by reference as a part of the present specification.

2. Background Art

Optical fiber wiring boards collect wiring groups of optical fibers optically connecting a plurality of optical parts, as wiring parts, and in electrical circuit terms, correspond to printed wiring boards which are employed in electrical circuit wiring, or to backplanes, which are used to conduct wiring between boards or between apparatuses. Methods which are known as manufacturing methods for optical fiber wiring boards include methods in which the optical fibers are coated with an adhesive and are then pressure applied to the surface of a substrate to form the wiring.

Japanese Patent No. 2,735,464 (U.S. Pat. No. 5,259,051) discloses, with respect to the manufacture of optical wiring boards (termed backplanes) which optically connect boards on which optical parts are mounted, an optical fiber interconnection apparatus and method in which "[a] rotatable wheel is mounted on a free end of a manipulator" and "a peripheral portion of the rotatable wheel causes one end of the optical fibers to adhere to the adhesive coated surface of the substrate."

Japanese Patent Application, First Publication No. HEI 7-181356 (U.S. Pat. No. 5,421,930) discloses an apparatus in which, in order to automatically wire optical fibers (pigtails) extending from optical devices onto a substrate, the stored optical fibers are wired onto an adhesive sheet by a rotatable wheel, termed a wiring wheel.

Japanese Patent Application No. HEI 9-281645 discloses, with respect to the structure of an optical wiring boards, a through hole which is provided in the lead end of a wiring head which bends an inserted optical fiber and, employing this stress, presses the optical fiber against an adhesive sheet and thus wires it.

In optical wiring boards, configurations are rare in which the wiring pattern of the optical fibers consists of parallel straight lines, and it is necessary to be able to conduct the wiring of free patterns in which the optical fibers bend and cross one another. Furthermore, it is necessary that the terminals of the optical fiber wiring boards have an arrangement which allows for multiconductors of optical part connectors so as to permit the direct connection of optical parts, in concert with an increase in integration, so that a wiring technique which accurately lines up optical fibers at a narrow pitch is extremely important.

The rotatable wheel, wiring wheel, and through hole described above are extremely important parts for the wiring of optical fibers on adhesive sheets, and these structures control the precision of the pattern and the degree of attachment to the substrate of the wiring.

The rotatable wheel of Japanese Patent No. 2,735,464 and the wiring wheel of Japanese Patent Application, First Publication No. HEI 7-181356 also have a structure in which a groove for supporting the optical fiber at a predetermined position is provided in the outer circumference of the rotatable wheel (wiring wheel). For this reason, in the wiring of a pattern having curved portions, when the rotatable wheel faces in the direction in which the pattern is proceeding, the optical fiber which is wired is compressed by the edge of the groove and becomes disordered, so that the optical fiber which has been caused to adhere to the substrate is likely to detach therefrom. This tendency becomes more pronounced as the radius of the curvature in the wiring pattern becomes smaller, or as the diameter of the rotatable wheel becomes larger.

In response to this, it is necessary that the radius of the rotatable wheel be set so as to be larger than the breakage curvature radius of the optical fiber which is wired (the breakage curvature radius of a commonly available single mode optical fiber core is approximately 2 mm), so that the optical fiber is not broken. Furthermore, in order to miniaturize the rotatable wheel, it is also necessary to miniaturize the bearing of the rotatable wheel which permits smooth rotation, and structurally, there Is a limit to such miniaturization.

Furthermore, in Japanese Patent No. 2,735,464, "as the manipulator moves, the rotatable wheel rotates as a result of friction, and by means of this, tension is exerted on the optical fiber, and by means of this, optical fiber is supplied from the reel on which the optical fiber is wound to the rotatable wheel, and is wired on the substrate," so that in order to wire the optical fiber in the manner of the wiring pattern it is necessary to rotate the rotatable wheel by means of friction and to draw exactly that length of optical fiber provided for in the pattern from the reel. However, in actuality, it is extremely difficult to rotate the rotatable wheel in such a manner as to draw only that length of optical fiber provided for in the pattern.

That is to say, when an optical fiber is wired in such a manner as to cross over a previously wired optical fiber, as a result of friction with the previously wired optical fiber when passing over this fiber, the rotatable wheel rotates; at such times, it is thought that sufficient friction cannot be obtained. Furthermore, when wiring is conducted while curving and passing over an optical fiber, a force acts in a transverse direction with respect to the direction of progression, slippage is produced with the lower-side optical fiber, and there is a danger that sufficient friction will not be obtained.

Furthermore, in methods employing a rotatable wheel, the optical fiber is supplied and wired by placing tension on the optical fiber between the rotatable wheel and the reel, so that when sufficient friction cannot be obtained as described above, sufficient tension cannot be obtained, and this makes it impossible to rotate the rotatable wheel in such a manner as to feed only that length of optical fiber which is provided for in the pattern. As a result, this presents a drawback, as it is impossible to achieve the wiring of the pattern.

In conventional wiring methods which employ rotatable wheels in this manner, a number of drawbacks are present, such as the fact that a previously wired optical fiber pattern may become disordered as a result of the rotatable wheel at portions of the wiring pattern which are curved, the precision of the curving pattern cannot be improved as a result of limitations in the miniaturization of the rotatable wheel, and the fact that wiring cannot be conducted as provided for in the pattern when the pattern is such that wiring must conducted over previously wired optical fibers. These present problems when the length of the optical fibers must be made standard or when internal board wiring requires an extremely detailed pattern.

On the other hand, the through hole disclosed in Japanese Patent Application No. HEI 9-281645, which adopts a wiring head mechanism and does not employ a rotatable wheel, does have a simple mechanism; however, because the optical fiber inserted into the through hole is bent at the edge portion of the through hole, the central axis of the through hole and the position at which the optical fiber is applied to the substrate are not in agreement, and the optical fiber is wired at a position which is displaced by a corresponding amount from the track of the wiring head. In the same way as the conventional technology described above, this problem is magnified in the case of so-called multiple wiring, in which the wiring of the pattern employs curves or in which wiring must be conducted over previously wired optical fibers. A method has been considered as a countermeasure to this problem in which the displacement is anticipated in advance and the movement of the wiring head is corrected; however, the mechanism becomes complex, and furthermore, in cases in which the distance between the central axis of the hole and the position at which the optical fiber is applied to the substrate change at points of intersection in the wiring, it is necessary to conduct further complex correction.

In this way, the problems in the wiring apparatus for optical fibers onto optical wiring boards and in the optical fiber wiring method interfere not only with improvements in wiring accuracy but also with the automation of the continuous wiring operation and with an increase in throughput by increasing wiring speed; these problems are not sufficiently considered by the prior art.

SUMMARY OF THE INVENTION

It is an object of the present invention to provide an optical fiber wiring apparatus and an optical fiber wiring method which solve the problems described above and serve to conduct automated wiring in which the movement of the wiring mechanism is accurately followed and multiple wiring is possible.

In order to attain the above object, the optical fiber wiring apparatus of the present invention is provided with a wiring substrate on which the optical fibers are wired; a wiring head which guides the optical fibers to the lead end thereof and forms an optical fiber path; an optical fiber feed mechanism which feeds the optical fiber during the wiring operation into the optical fiber path of the wiring head; an optical fiber contact mechanism, which brings the optical fiber, which has been guided to the lead end of the wiring head via the optical fiber path, and the wiring substrate into contact: an XY movement mechanism, which moves the wiring substrate and the wiring head relative to one anther in the X and Y directions in the state in which the optical fiber at the lead end of the wiring head has been placed in contact with the wiring substrate by the optical fiber contact mechanism; and an optical fiber affixing mechanism, which successively affixes, to the wiring substrate, the optical fiber which has been brought into contact with the wiring substrate during movement by XY movement mechanism.

In the optical fiber wiring apparatus having this structure, by means of the optical fiber feed mechanism, the optical fiber is fed into the optical fiber path of the wiring head, and by means of the optical fiber contact mechanism, the wiring substrate and optical fiber guided to the lead end of the wiring head are brought into contact. Furthermore, in this state, the wiring substrate and the wiring head are moved relative to one another in the XY directions by the XY movement mechanism, and furthermore, when movement is conducted by the XY movement mechanism, the optical fiber brought into contact with the wiring substrate is successively affixed to the wiring substrate by the optical fiber affixing mechanism.

By means of this, the movement of the wiring head is accurately followed, and multiple wiring becomes possible.

Furthermore, the optical fiber wiring apparatus of the present invention is a optical fiber wiring apparatus which lays optical fiber down on a wiring substrate; which is provided with a manipulator which is disposed in a plane which is approximately parallel to the surface of the wiring substrate in a movable manner, and which conducts the laying operation of the optical fibers on the wiring substrate, and which manipulator is further provided with: a fiber feed mechanism for feeding optical fibers, a wiring mechanism for wiring, onto the wiring substrate, optical fibers fed by the optical fiber feed mechanism; a Z axial rotation mechanism which rotates about an axis approximately perpendicular to the surface of the wiring substrate and thereby changes the orientation of the wiring of the wiring mechanism; and an optical fiber cutting mechanism which cuts optical fiber fed by the optical fiber feed mechanism.

In an optical fiber wiring apparatus having this structure, while the optical fiber fed by the optical fiber feed mechanism is been wired onto the wiring substrate by the wiring mechanism, the wiring mechanism is moved by the manipulator, and furthermore, the orientation of the wiring of the wiring mechanism is changed by the Z axial rotation mechanism, and thereby, the optical fiber is wired along the pattern.

Then, when wiring is completed, the optical fiber is cut to the length necessary for the wiring by the optical fiber cutting mechanism, and by wiring the entirety of this optical fiber along the pattern, the wiring of the optical fiber is completed, and the wiring operation either terminates, or the wiring of a new optical fiber is conducted in the same manner.

In this way, the optical fiber wiring apparatus is provided with an optical fiber feed mechanism and an optical fiber cutting mechanism, a Z axial rotation mechanism, and a wiring mechanism, so that it is possible to automate a series of processes of the optical fiber wiring.

An optical fiber cutting mechanism is not disclosed in Japanese Patent No. 2,735,464, in Japanese Patent Application, First Publication No. HEI 7-181356, or Japanese Patent Application 9-281645, so that, although patterns in which there is only one starting point/ending point group may be wired, it is impossible to automate wiring operations for patterns having a plurality of such groups.

Furthermore, the optical fiber wiring method of the present invention is a wiring method which conducts the wiring of an optical fiber onto a wiring substrate, wherein the feeding of this optical fiber is adjusted by an optical fiber feed mechanism so that the tension on the optical fiber is within a fixed range, the optical fiber fed by the optical fiber feed mechanism is wired onto the wiring substrate by a wiring mechanism, and the optical fiber is cut to the length required for the wiring by the optical fiber cutting mechanism.

A mechanism for adjusting the tension on the optical fiber by an optical fiber feed mechanism is not disclosed in Japanese Patent No. 2,735,464, Japanese Patent Application, First Publication No. HEI 7-181356, or Japanese Patent Application No. HEI 9-281645, and it is thus impossible to avoid fluctuations in the tension placed on the optical fiber resulting from deficiencies and the like in the amount of rotation of the rotatable wheel or fluctuations in the wiring speed, thus leading to disorder in the wiring. Furthermore, an optical fiber cutting mechanism is not disclosed, so that it is impossible to automate the wiring operations of patterns in which wiring and cutting are repeated, that is to say, in which a plurality of wirings take place.

In the optical fiber wiring method of the present invention described above, an optical fiber feeding mechanism and an optical fiber cutting mechanism and a wiring mechanism are incorporated, and thereby, it is possible to control the feeding of the optical fiber and to conduct accurate wiring. Furthermore, it is possible to automate the series of operations in wiring from the initiation of wiring to the cutting of the optical fiber at the termination of wiring.

Furthermore, the optical fiber wiring method of the present invention is an optical fiber wiring method which employs an optical fiber wiring apparatus which is provided with a wiring substrate, a wiring head which applies an optical fiber to the wiring substrate with a predetermined force, and an optical fiber feed mechanism which feeds stocked optical fiber, which apparatus moves the wiring substrate and the wiring head relative to one another in the XY directions and conducts wiring operations which form a desired optical fiber wiring pattern on the wiring substrate; wherein an optical fiber of predetermined length is fed by the optical fiber feeding mechanism, in a manner unrelated to the wiring, either before or after the wiring operation or both before and after the wiring operation, and an optical wiring board having optical fibers of a predetermined length connected to the wiring pattern either before or after the wiring pattern by means of the wiring operation or both before and after said wiring pattern.

One type of optical wiring board is an optical wiring board of a type in which, at the outer side of the wiring board, end parts of optical fibers forming the wiring pattern are provided in such a manner as to extend for a predetermined length. Manufacturing methods for optical wiring boards having this type of special form are nowhere disclosed in the conventional technology described above.

In accordance with the optical fiber wiring method of the present invention, it is possible to cause the parts which form the ends of the wiring pattern in the optical fibers to project to the sides of the wiring substrate by a predetermined length, and it is thus possible to produce optical wiring substrates in which the end parts of optical fibers project by a predetermined length to the sides of the wiring substrate.

Here, as described above, after one wiring pattern has been wired by the optical fiber wiring apparatus, another wiring pattern is wired in a continuous fashion, and either parallel with the wiring operation or after the termination of the wiring operation, the optical fibers mounted between wiring patterns are cut, and thereby, it is possible to wire a plurality of wiring patterns so that the end parts project to the outside of the wiring substrate.

Furthermore, the optical fiber wiring method of the present invention is an optical fiber wiring method which employs an optical fiber wiring apparatus which is provided with a wiring substrate, a wiring head which is provided with an optical fiber path which guides an optical fiber to the lead end thereof and which applies the optical fiber guided to the lead end to the wiring substrate with a predetermined force, and an optical fiber feeding mechanism which feeds stocked optical fiber, which apparatus moves the wiring substrate and the wiring head relative to one another in the XY directions and conducts a wiring operation which forms a predetermined optical fiber wiring pattern on the wiring substrate; wherein, at the initiation of wiring, the wiring head is moved to a wiring initiation position, and in the state in which the optical fiber has been guided to the lead end of the wiring head, this is pressed against the wiring substrate, the wiring head is moved along the wiring pattern with respect to the wiring substrate, the required optical fiber is fed into the optical fiber path of the wiring head by the optical fiber feeding mechanism, and wiring is conducted.

In an optical fiber wiring method structured in this manner, the optical fiber is fed into the optical fiber path of the wiring head by the optical fiber feeding mechanism, and the optical fiber guided to the lead end of the wiring head is pressed against the wiring substrate by the wiring head, and the wiring substrate and the wiring head are moved relative to one another in the XY directions. Furthermore, the required optical fiber is fed into the optical fiber path of the wiring head by the optical fiber feeding mechanism.

By means of this, multiple wiring which accurately follows the movement of the wiring head becomes possible.

Furthermore, the optical fiber wiring method of the present invention is an optical fiber wiring method in which an optical fiber is laid on a wiring substrate by a wiring head, at least a lead end of which is formed with a spherical surface, which has formed in a side surface part thereof a guide groove which guides an optical fiber to the spherical surface part, and which has a pressure groove which extends from the guide groove to the top part of the spherical surface part; wherein, at the initiation of wiring, the wiring head is moved to a wiring initiation position, an optical fiber is fitted into the pressure groove and is pressed against the wiring substrate, the wiring head is moved along the wiring pattern with respect to the wiring substrate, and wiring is conducted.

In the optical fiber wiring operation, in order to automate the wiring of multiple patterns in which wiring and cutting are repeated, that is to say, the wiring of a plurality of wiring patterns which are not continuous, it is necessary to employ a method in which the end part of an optical fiber is automatically installed in the pressure groove of the wiring head at the initiation of wiring; however, this is not found in Japanese Patent No. 2,735,464, Japanese Patent Application, First Publication No. HEI 7-181356, or Japanese Patent Application No. 9-281645.

In accordance with optical fiber wiring method described above, by advancing the manipulator in a state in which the lead end of an optical fiber is pressed onto the wiring substrate, it is possible to fit the lead end of the optical fiber into the pressure groove of the wiring head and thus install it, and it is possible to automatically initiate wiring from a freely selected position on the wiring substrate.

BRIEF DESCRIPTION OF THE DIAGRAMS

DETAILED DESCRIPTION OF THE PREFERRED EMBODIMENTS

Embodiment 1

Hereinbelow, a first embodiment of the optical fiber wiring apparatus and optical fiber wiring method of the present invention will be explained using FIGS. 1 through 6.

Figure 1:
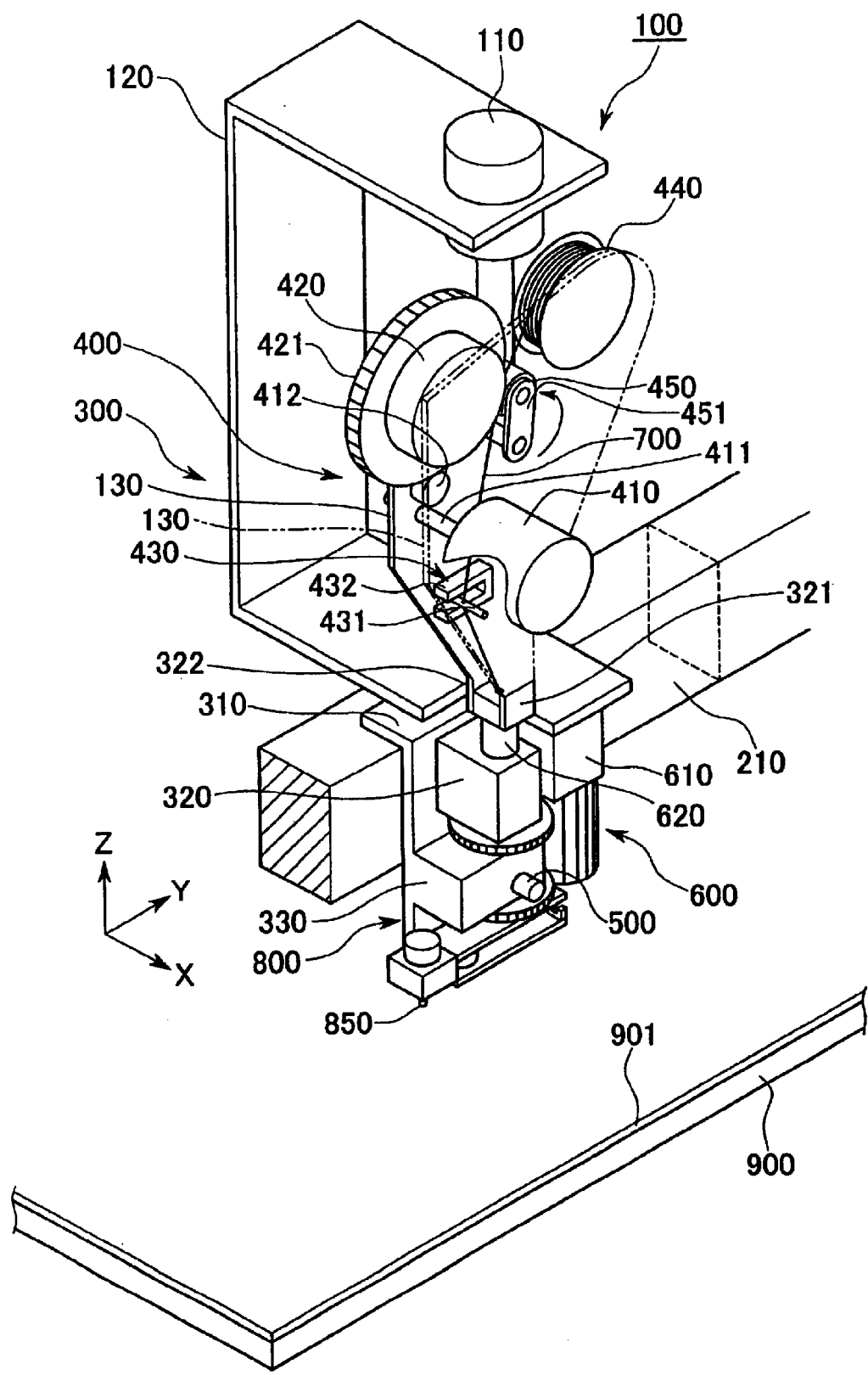
FIG. 1 is a perspective view showing the makeup and structure of an optical fiber wiring apparatus in accordance with a first embodiment of the present invention.

FIG. 1 is a perspective view showing the main parts of the structure of an optical fiber wiring apparatus (100).

The optical fiber wiring apparatus (100) wires an optical fiber onto a substrate adhesive layer (901) (the optical fiber affixing mechanism in the present embodiment), which is provided on a wiring substrate (900).

The optical fiber wiring apparatus (100) has a structure such that a manipulator (300), which is provided with an optical fiber feed mechanism (400), an optical fiber cutting mechanism (500), a Z axial rotation mechanism (600), and a wiring mechanism (800), is attached to an XY movement mechanism arm (210) via a carriage (310) (only arm (210) is shown in the Figure). The movement of this is controlled by a control apparatus which is not depicted in the figure.

The XY movement mechanism arm (210) is disposed so as to be capable of movement in, for example, one direction (for example, in FIG. 1, the X axial direction) in a plane parallel to the wiring substrate (900) on which the optical fibers (700) are wired.

The carriage (310) is a member which is provided, so as to be capable of movement in a direction along the arm (210) (for example, the Y axial direction), on arm (210) via a movement mechanism which is not depicted in the figure. The carriage (310) is provided with a support member (320) which is positioned to the side of arm (210) and which supports the lower portion of the optical fiber feeding mechanism (400), and a intermediate member (330) which is positioned below the support member (320) and which incorporates a wiring mechanism (800) and an optical fiber cutting mechanism (500). Furthermore, a Z axial rotation mechanism (600) and frame 1 (120) are also attached to the carriage (310).

The frame 1 (120) is a member which is formed with approximately a C shape so as to be capable of disposing an optical fiber feeding mechanism (400) between the upper part thereof and the region above the support member (320). Furthermore, a lead wire support member (110), comprising a rotatable member housing an electrical contact element (brush) for sending electricity to the optical fiber feeding mechanism (400) and for receiving electricity from a control apparatus described hereinbelow, is provided in the upper part of frame 1 (120). Additionally, the lead wire support member (110) is attached to frame 1 (120) in such a manner that the rotational center thereof is in agreement with the center of the Z axial rotation, that is to say, with the axis of the Z axial shaft (620) (the Z axial rotation mechanism (600) described hereinbelow) which is provided in the upper part of the support member (320). The lead wire support member (110) is capable of supplying electricity to the optical fiber feeding mechanism (400) while permitting the rotation, approximately about the Z axis, of the optical fiber feeding mechanism (400).

Furthermore, two plate shaped frames 2(130) are provided between the lead wire support member (110) and the Z axis shaft (620), and the upper ends of these are respectively connected to the rotatable part of the lead wire support member (110), while the lower ends thereof are connected to the Z axis shaft (620), in a state in which they are separated by a predetermined distance. That is to say, these frames 2(130) are disposed so as to permit Z axial rotation by the Z axial rotation mechanism (600). Here, the lower ends of the frames 2(130) are connected to the Z axis shaft (620) via a feeding mechanism connection part (321).

The following are attached between these frames 2(130): a feed reel (420), which feeds the optical fiber (700); an optical fiber storage reel (440), on which the optical fiber (700) is wound, and which supplies the optical fiber (700) to the feed reel (420); a pinch roller (450) which holds and presses the optical fiber (700) between itself and the peripheral surface of the feed reel (420), and a deflection sensor (430), which detects deflection (slack) in the optical fiber (700) fed from the feed reel (420). Here, the optical fiber storage reel (440) is capable of winding an optical fiber (700) of a length allowing a plurality of wirings, and this serves the function of an optical fiber storage part for storing optical fiber (700).

Furthermore, a optical fiber feed motor (410) (drive apparatus) which causes the rotation of the feed reel (420) is attached to the outside of one frame 2(130). The optical fiber feed motor (410) is provided in such a manner that the drive axle (411) thereof reaches the outside of the opposite frame 2(130). Gears which are not depicted in the figure are provided in this drive axle (411) at a part positioned between frames 2, and between this part and the feed reel (420), gears (412) which enable rotation about an axis parallel to the drive axle (411) are provided.

The feed reel (420) and the optical fiber storage reel (440) are supported at both ends thereof in the respective axial directions by the two frames 2(130), and these are disposed so as to be rotatable along a plane roughly parallel to the surfaces of frames 2(130).

A flange shaped gear part (421) is formed in the feed reel (420): this engages with the gears (412) which engage with the drive axle (411) of the optical fiber feed motor (410) at one end in the axial direction, and by means of this, the rotation of the drive axle (411) is transmitted to the feed reel (420).

The feed reel (420), the optical fiber storage reel (440), the pinch roller (450), the deflection sensor (430), and the optical fiber feed motor (410) form an optical fiber feed mechanism (400) which supplies the optical fiber (700).

The operation of the optical fiber feed motor (410) is controlled by a control apparatus (drive circuit), not depicted in the figure, on the basis of detection signals from the deflection sensor (430).

The pinch roller (450) is supported on frame 2(130) by a stay (451), which makes the pinch roller itself rotatable, makes the position to the side of the pinch roller (450) a support point, and is rotatable about an axis parallel to the axis of the pinch roller (450); a spring which conducts urging so that the peripheral surface of the pinch roller (450) is pressed against the feed reel (420) is attached to the stay (451) (not depicted in the figure).

The deflection sensor (430) comprises a photosensor (432) which is roughly C-shaped and which is molded in a unitary fashion so that an LED element and a PD light receiving element are disposed in mutual opposition and separated by a predetermined distance, and a detection bar (431), one end of which is attached to the frame 2(130) which receives the tension of the optical fiber (700) and thereby, using the attachment part to frame 2(130) as a support point, is disposed so as to be capable of swinging the lead end thereof in a direction crossing between the LED element and the PD light receiving element of the photosensor (432).

The deflection sensor (430) is disposed so as to detect the slack in the optical fiber (700) by detecting displacement of the lead end of the detection bar (431) by the photosensor (432) as a result of non-contact. The detection bar (431) has formed in the vicinity of the lead end thereof a through hole (not depicted in the figure) through which the optical fiber (700) passes, and is disposed so as to swing as a result of the tension of the optical fiber (700) inserted through the through hole. Here, detection bar (431) is capable of accurately following slight deflections of the optical fiber (700) by reducing the friction at the support point.

Here, the optical fiber feed mechanism (400) has the parts thereof disposed so as to achieve a weight balance of the installed parts about the rotational axis, so that smooth rotation is possible about the Z axial rotation mechanism (600).

Figure 3:
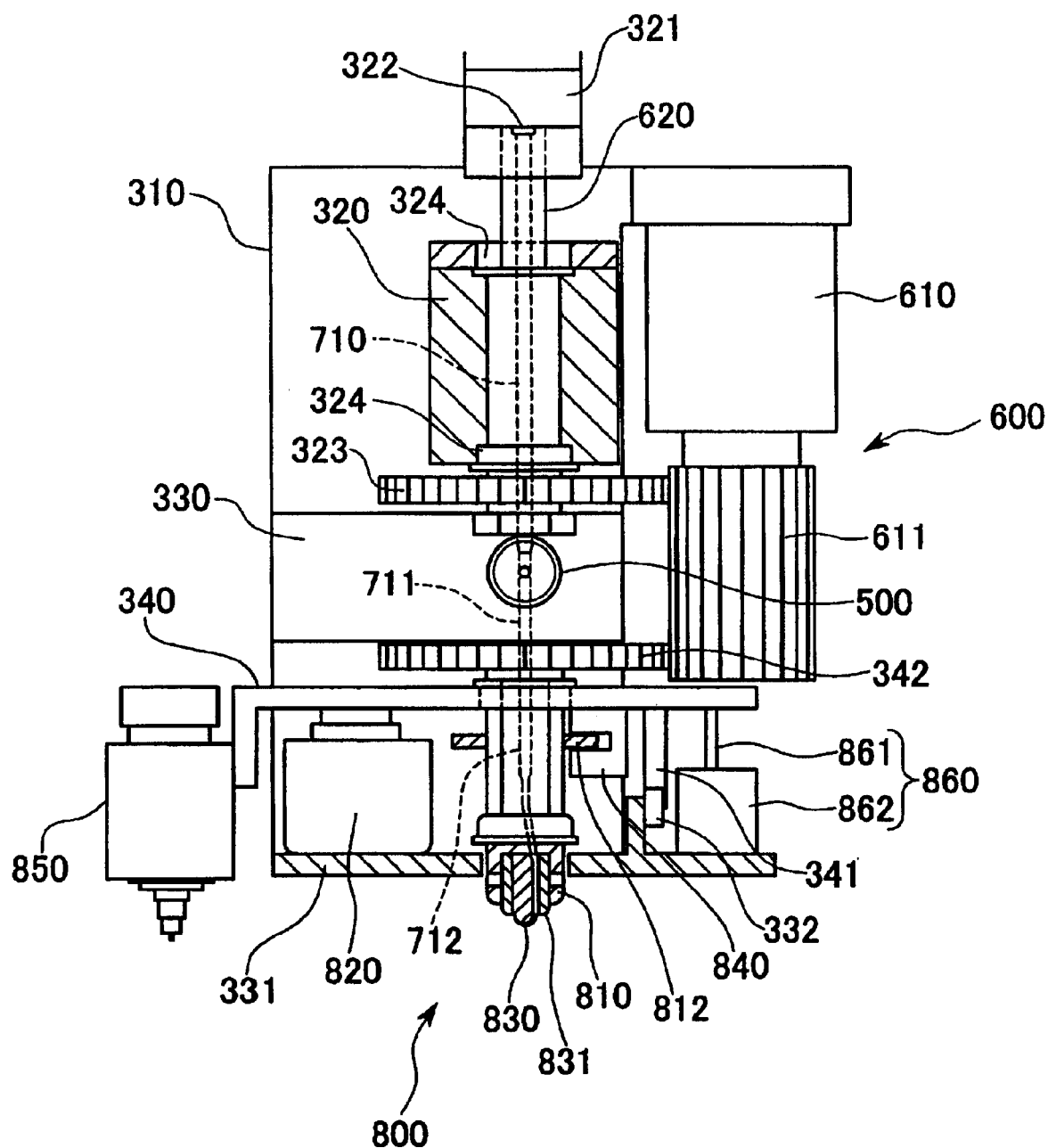
FIG. 3 is a front view showing the makeup and structure of the main parts of the optical fiber wiring apparatus of the first embodiment of the present invention.

The structure of the main parts of the optical fiber wiring apparatus (100) are shown in FIG. 3. FIG. 3 is a front view showing the vicinity of the carriage (310). Here, as described above, the upper structure of the manipulator (300) (the structure provided by frame 1 (120) and frames 2 (130) is affixed to a feed mechanism connection part (321) which is attached above the support member (320) of the carriage (310) via the Z axis shaft (620). As shown in FIG. 3, this feed mechanism connection part (321) has formed therein an optical fiber insertion hole 322 for guiding the optical fiber (700) sent from the upper structure (not depicted in FIG. 3) in the downward direction.

The support member (320) has formed therein an optical fiber path 1 (710) which, as shown in FIG. 3, has a center portion which is bored through in a cylindrical shape and communicates with the top and bottom, and furthermore, rotational bearings (324) are fitted into the upper and lower ends, respectively.

The Z axis shaft (620) is attached coaxially to the inner ring of the upper end of the rotatable bearing (324), while an upper gear (323) is coaxially attached to the inner ring of the lower end of the rotatable bearing (324) (Z axial rotation mechanism (600)), and furthermore, the inner rings of the upper and lower rotatable bearings (324) are connected so as to rotate in a unitary fashion while securing the optical fiber path 1 (710) at the inner circumferencial side.

The upper gear (323) has a structure such that it engages from above with the pinion (611) which is provided in a fixed manner on the drive axle of the Z axial motor (610) (Z axial rotational mechanism (600)) which is disposed adjoining the support member (320). Accordingly, by rotating the Z axial motor (610), the upper part of the structure of the manipulator with the exception of frame 1 (120), that is to say, the feed mechanism connection part (321) and the optical fiber feed mechanism (400) connected thereto, may be rotated about the Z axis. Here, the Z axis designates an axis which is approximately perpendicular to the plane of the wiring substrate (900).

An intermediate member (330) is disposed immediately below the upper gear (323) which is attached to the support member (320). An optical fiber path 2 (711) which is coaxial with the optical fiber path (710) formed in the support member is bored in this intermediate member (330); furthermore, an optical fiber cutting mechanism (500) which cuts the optical fiber (700) is attached to this intermediate member (330).

A lower gear (342) is provided immediately below intermediate member (330) and parallel with upper gear (323). This lower gear (342) is attached in a fixed manner coaxial with the upper part of a wiring plunger (810) of wiring mechanism (800) described below, and is disposed so as to engage with the bottom portion of a pinion (611) of the Z axial motor (610). Furthermore, the lower gear (342) is formed so as to have the same diameter as the upper gear (323) so that the rotational angle thereof is the same as that of the upper gear (323) when rotationally driven by the pinion (611).

Accordingly, the structure is such that the upper and lower gears (323 and 342) may be rotated synchronously by rotating the Z axial motor (610), and these may be rotated synchronously with the upper part of the structure of the manipulator, that is to say with the optical fiber feed mechanism (400) and the wiring head (830) described hereinafter. Here, wiring mechanism (800) is disposed so as to be movable in the vertical direction so as to efficiently conduct the wiring of the optical fiber (700), and the lower gear (342) also moves upwardly and downwardly in accordance with the upward and downward motion of the wiring mechanism (800); however, at this time, the pinion (611) is disposed so as to reach to the lowermost position within the range of movement of the lower gear (342) so that the lower gear (342) and the pinion (611) do not become disengaged.

Next, with reference to FIGS. 2 and 3, the wiring mechanism (800) will be explained in detail.

Figure 2:
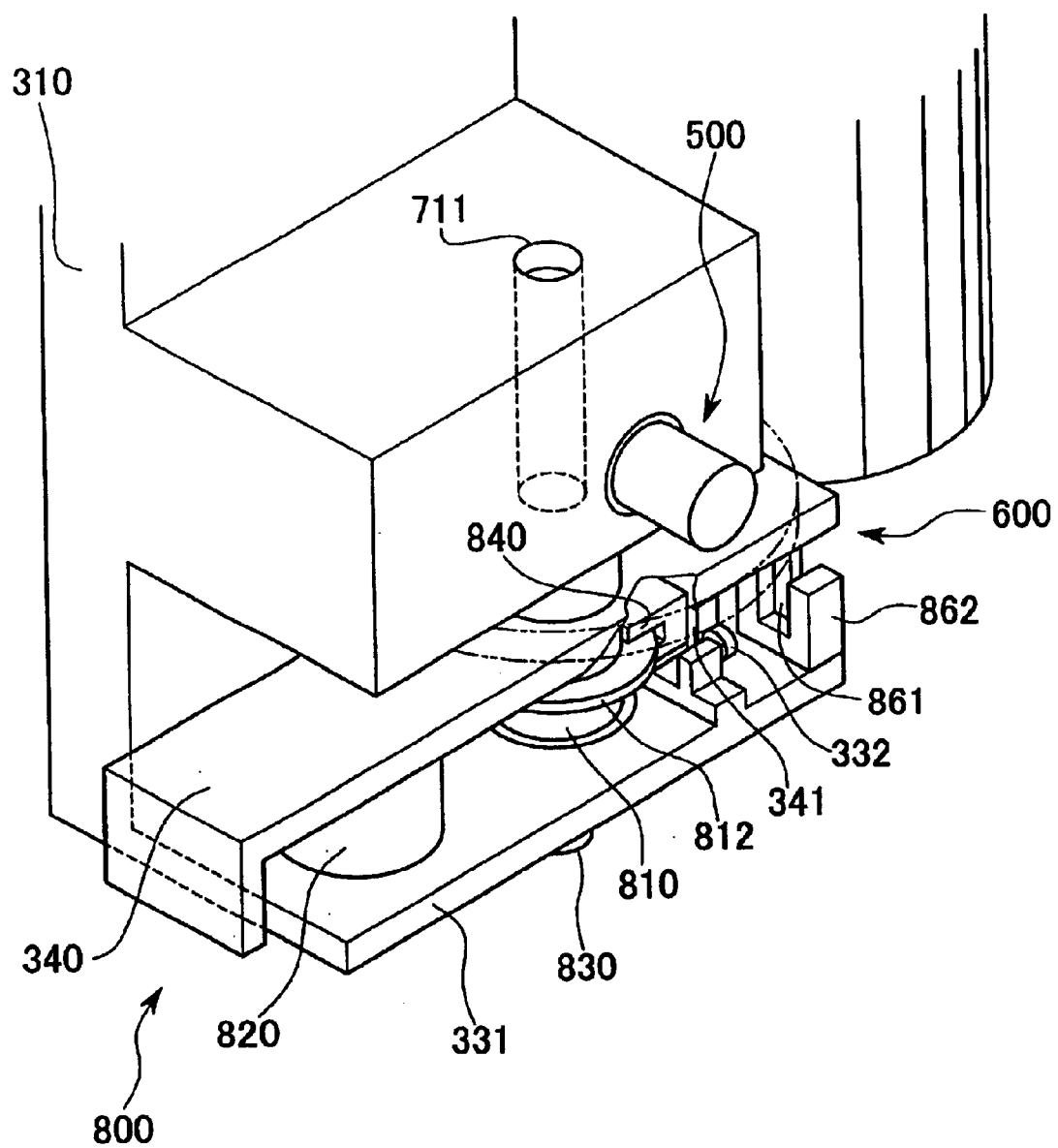
FIG. 2 is an enlarged angle view showing the makeup and structure of the wiring mechanism of the optical fiber wiring apparatus of FIG. 1.

As shown in the magnified perspective view of FIG. 2, the wiring mechanism (800) has a structure such that a Z axis actuator (820) which is provided with a raising and lowering portion which is capable of vertical motion is affixed on a fixed plate (331) which is provided in a unitary manner at the lower end of the carriage (310), and a raising and lowering plate (340) is attached to the raising and lowering part of the Z axis actuator (820). Additionally, as shown in FIG. 3, a wiring plunger (810) and drawing pen (850) are installed on the raising and lowering plate (340). The wiring mechanism (800) forms an optical fiber contacting mechanism which brings the optical fiber (700) guided to the lead end of the wiring head (830) described below into contact with the wiring substrate (900).

A through hole, through which the wiring plunger (810) passes, is formed in the raising and lowering plate (340), and the wiring plunger (810) is attached in such a way that it is capable of rotation about the Z axis with respect to the through hole. Furthermore, the drawing pen (850) is attached in such way as to extend to the side of the fixed plate (331) and so as to be capable of attachment to and detachment from the raising and lowering plate (340).

A through hole is provided in fixed plate (331) at a position opposed to the wiring plunger (810), and the wiring plunger (810) projects downwardly from the fixed plate (331) through the through hole.

In the structure described above, the relationship between the drawing pen (850) and the wiring plunger (810) is set so that, for example, as shown in FIG. 3, the tip of the drawing pen (850) is at a lower position.

Here, as shown in FIG. 3, a detent (341) formed with an end surface which is perpendicular to the raising and lowering plate (340) is provided at the lower surface of the raising and lowering plate (340) so as to permit only the vertical motion of the raising and lowering plate (340) and to prevent the rotation of the raising and lowering plate (340); two rollers (332) which hold the end surface of the detent (341) therebetween and which conduct guiding in the vertical direction are attached to the fixed plate (331) (in FIG. 3, only one of rollers (332) is depicted).

Furthermore, a height detector (860) is provided between the raising and lowering plate (340) and the fixed plate (331); this detects the height of the raising and lowering plate (340) from the wiring substrate (900), or in other words, the height of the wiring plunger (810) or the drawing pen (850) from the wiring substrate (900). In the present embodiment, a linear encoder is employed as the height detector (860). The linear encoder is provided on the bottom surface of the raising and lowering plate (340) and is provided with a movement scale (861), in which a plurality of detection slits are formed at approximately equal spacings in the vertical direction, and an approximately C-shaped photosensor (862), which, at the fixed plate (331), is unitarily molded in a form such that the LED element and PD light receiving element are in mutual opposition with the course of the movement scale (861) therebetween and separated by a predetermined distance. The photosensor (862) detects the direction of passage of the slits of the movement scale (861) and the number passed and sends a detection signal to a control apparatus which is not depicted in the figure, and the control apparatus detects the height of the raising and lowering plate (340) from the wiring substrate (900) based on this detection signal.

The wiring plunger (810) is attached in such a manner that it is capable of rotation about the Z axis in the through hole of the raising and lowering plate (340) via a bearing or the like. A lower gear (342) is affixed in a coaxial manner to the upper end of the wiring plunger (810), and by means of this, the rotation of the pinion (611) of the Z axial motor (610) is transmitted to the wiring plunger (810). Additionally, a wiring head (830), which presses the optical fiber (700) (not depicted in FIG. 3) against the wiring substrate (900) and conducts wiring is provided at the lead end of the wiring plunger (810).

Furthermore, a disc-shaped detection collar (812), which is made in such a manner as to rotate unitarily with the wiring plunger (810), is attached to the wiring plunger (810) at a part positioned between the fixed plate (331) and the raising and lowering plate (340). Here, a rotational reference sensor (840), which reads slits provided in the detection collar (812), is attached to the lower surface of the raising and lowering plate (340).

The slits of the detection collar (812) are provided at a position which is in the same phase with the pressure groove (832) (described hereinbelow) of the wiring head (830) attached to the wiring plunger (810), viewed from an orientation perpendicular to the axial center of the wiring plunger (810) and using this axial center as a center. Here, the position at which the rotational reference sensor (840) detects this slit is the reference position (origin of rotation) of the wiring plunger (810).

As shown in FIG. 3, an optical fiber path 3 (712) is provided in the lower gear (342) and the wiring plunger (810); this communicates with optical fiber path 2 (711) provided in the intermediate member (330). The optical fiber path 3 (712) is positioned at the rotational center through approximately the upper half of the wiring plunger (810), and in the lower half thereof, is inclined so as to depart from the rotational center as it progresses downward; this path is disposed so as to guide an inserted optical fiber (700) within a guide groove (831) formed in the side surface of the wiring head (830).

Figure 4:
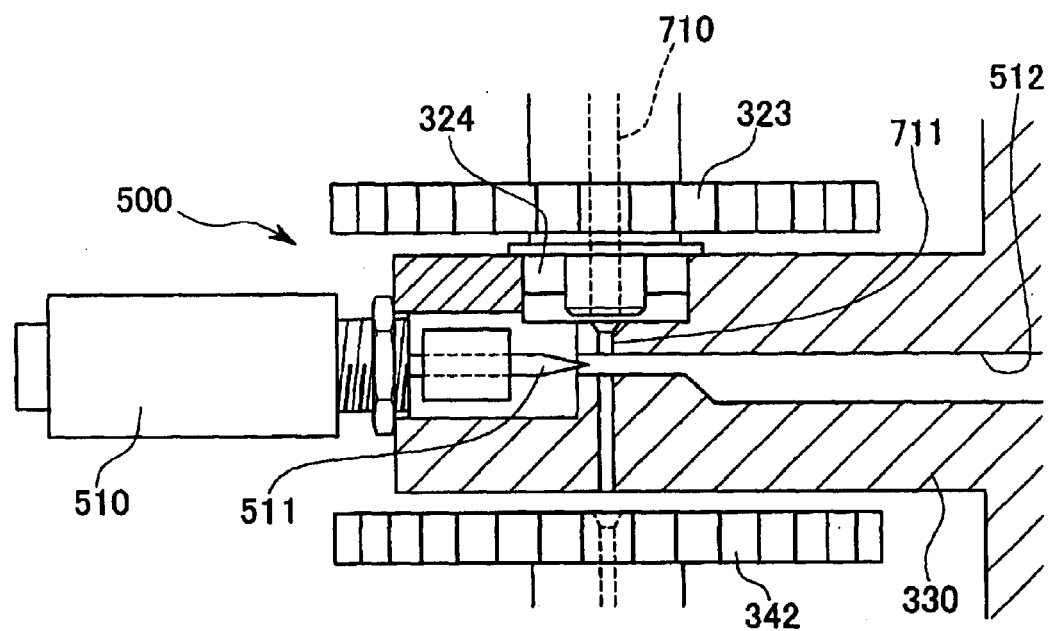
FIG. 4 is an enlarged side cross-sectional view showing the makeup and structure of the optical fiber cutting apparatus of the optical fiber wiring apparatus in the first embodiment of the present invention.

FIG. 4 is an enlarged side cross-sectional view showing the structure of an optical fiber cutting mechanism (500).

The optical fiber cutting mechanism (500) is provided in the intermediate member (330) which is positioned between the upper gear (323) and the lower gear (342). An optical fiber path 2 (711) is formed in the intermediate member (330); this communicates with the optical fiber path 1 (710) of the upper gear (323) and an optical fiber (700) (not depicted in FIG. 4) is inserted thereinto, and by means of this, the path has the function of a guide member for guiding an optical fiber (700). Furthermore, a through hole (512) which communicates with the side of the optical fiber path 2 (711) is formed in the intermediate member (330).

The optical fiber cutting mechanism (500) comprises a cutter (511) which is provided in such a manner as to be capable of crossing the optical fiber path 2 (711) within through hole (512), and with an electromagnetic slider (510), which moves the cutter (511) in such a way as to cross the optical fiber path 2 (711). The electromagnetic slider (510) is preferably an electric solenoid.

The lead end of the cutter (511) has the shape of an edge, and by causing this edge to cross the optical fiber path 2 (711) by moving in such a manner as to slide within the through hole (512), the optical fiber (700) within the optical fiber path 2 (711) is cut. In this case, the cutter (511) may be in the shape of a knife or may be in a shape which permits its use as a hole punch (in which the lead end surface of the cutter (511) has a cylindrical peripheral surface shape in which it is concave on the base end side, and the ridge line part where the lead end surface and the side surfaces intersect forms a cutting blade).

By momentarily applying a current to the electromagnetic slider (510), the cutter (511) is momentarily extended rightwardly in the figure, and the cut remainder of the optical fiber (700) may be expelled into the large diameter portion of the through hole (512) which lies to the right.

Figure 5A:
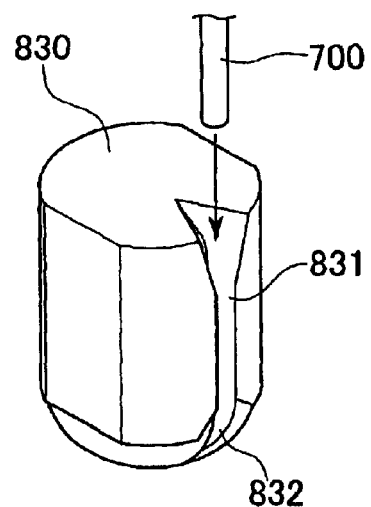
FIG. 5(a) is an enlarged angled view of essential parts showing the makeup and structure of the wiring head of the optical fiber wiring apparatus in the first embodiment of the present invention.

FIG. 5(a) is an enlarged perspective view showing the structure of the wiring head. Wiring head (830) has the form of a cylinder having two surfaces on the sides thereof which face one another; the bottom surface (lead end) thereof has a hemispherical shape. This lead end is positioned at the rotational center of the wiring plunger (810) (not depicted in FIG. 5) to which the wiring head (830) is attached. Furthermore, the material thereof is a material having a coefficient of friction lower than the optical fiber; in the present embodiment, Teflon (produced by Dupont) is employed, and by means of this, the feeding of the optical fiber (700) from the wiring head (830) can be accomplished smoothly.

A guide groove (831), which extends to the lower surface of the hemispherical region, is formed in one of the side surfaces of the wiring head (830) which have a curved shape, and a pressure groove (832), which is a continuation of the guide groove (831) and which reaches the lead end part of the bottom surface, is formed in the bottom surface.

The guide groove (831) is formed so that the groove becomes deeper upwardly from an appropriate point, so as to facilitate the insertion of the lead end of the optical fiber (700). Furthermore, the pressure groove (832) is formed with a radius of curvature larger than the radius of curvature at which the optical fiber breaks, so as to support the optical fiber (700) in a state in which it is bent by a fixed amount and is pressed onto the wiring substrate (900). Additionally, the groove is formed so as to become narrower and shallower as it approaches the lead end of the wiring head (830) so that the lead end of the wiring head (830) and the substrate adhesive layer (901) do not come into contact during wiring, and so that there is no play in the optical fiber (700) at the lead end of the wiring head (830).

As described above, it is possible to automate this series of operations of the wiring by installing, on the manipulator (300), an optical fiber feed mechanism (400), an optical fiber cutting mechanism (500), a Z axial motor (610) and a wiring mechanism (800), in the optical fiber wiring apparatus (100).

Hereinbelow, the process of the wiring operation of the optical fiber (700) by the optical fiber wiring apparatus (100) will be explained with reference to FIGS. 5(a) and (b). During the wiring operation, the drawing pen (850) is removed from the raising and lowering plate (340).

First, the manipulator (300) is moved to the wiring initiation position on the wiring substrate (900) by an XY movement mechanism arm (210).

Then, in the state in which the pressure groove (832) of the wiring head (830) is oriented in a direction at a tangent to the wiring pattern by the Z axial rotation mechanism (600), the optical fiber (700) is supplied to the wiring head (830) at the lead end of the wiring plunger (810) by the optical fiber feed mechanism (400).

In this state, the wiring plunger (810) is brought into the vicinity of the wiring substrate (900) and the optical fiber (700) is pressed onto the substrate adhesive layer (901) of the wiring substrate (900). Then, the manipulator (300) is moved along the wiring pattern by the XY movement mechanism arm (210), and the optical fiber (700) is wired along the wiring pattern.

Then, when the wiring is completed, the optical fiber (700) is cut to the same length as the wiring pattern by the optical fiber cutting mechanism (500), and by means of the wiring mechanism (800), the optical fiber (700) remaining in the optical fiber path 2 (711) and the optical fiber path 3 (712) is wired to the end of the wiring pattern.

After this, the wiring plunger (810) is separated from the wiring substrate (900), the wiring head (830) is removed from the wiring substrate (900), and the wiring operation is either terminated or the wiring operation of a new wiring pattern is conducted by repeating the above process.

Hereinbelow, each of the steps of the process of the wiring operation of optical fiber (700) by the optical fiber wiring apparatus (100) described above will be explained in detail.

The rotational operation of the wiring plunger (810) by the Z axial rotation mechanism (600) is carried out by rotationally driving a pinion (611) by the Z axial motor (610), and by means of this rotationally driving the lower gear (342), and thus rotating the wiring plunger (810) which is connected to the lower gear (342). At this time, the pinion (611) is rotated synchronously with the upper gear (323), so that the optical fiber feed mechanism (400) is also rotated synchronously with the wiring plunger (810).

Furthermore, the wiring plunger (810) has a rotational origin which is determined by the position of the slit formed in the detection collar (812). Accordingly, in the optical fiber wiring apparatus (100) of the present invention, prior to the initiation of wiring, the Z axial motor (610) is caused to rotate in a state in which the rotational reference sensor (840) is functioning and the rotational origin is recognized, and then, rotation is conducted by Z axial motor (610) by only the amount necessary from the rotational origin, and thereby, the pressure groove (832) of the wiring plunger (810) is oriented in a direction at a tangent to the wiring pattern.

The feeding of the optical fiber (700) by the optical fiber feed mechanism (400) is conducted by rotationally driving the feed reel (420) by driving the optical fiber feed motor (410). By means of this, optical fiber (700) is drawn from the optical fiber storage reel (440), and this is supplied to the wiring head (830) at the lead end of the wiring plunger (810) of the wiring mechanism (800) via optical fiber paths 1, 2, and 3 (710, 711, and 712).

Here, so that the tension on the optical fiber (700) which is fed is maintained within a standard range, the deflection of the optical fiber (700) is detected by a deflection sensor (430), and the operation of the optical fiber feed motor (410) is controlled by a control apparatus (drive circuit) not depicted in the figure on the basis of this detection signal, and the rotation of the feed reel (420) is controlled. Concretely, so as to maintain the deflection constantly within a range which is set in advance during wiring, the rotation of the feed reel (420) carried out if deflection is not present, and the stoppage of rotation when the amount of deflection exceeds the set range, are repeated. Furthermore, at this time, in the wiring operation, when there is no change in the amount of deflection during a standard period, a control apparatus not depicted in the figure makes a determination that there has been a failure in wiring and sends an error signal, and the wiring operation is halted.

In operations for bringing the wiring plunger (810) to the vicinity of the wiring substrate (900), or for removing the wiring plunger therefrom, by raising or lowering a raising and lowering part of the Z axis actuator (820) provided on the upper surface of the fixed plate (331), the raising and lowering plate (340) and the wiring plunger (810) may be caused to approach or depart from the wiring substrate (900) without deviating from the axis.

Here, the distance between the wiring plunger (810) and the wiring substrate (900), that is to say, the height by which the wiring head (830) is separated from the wiring substrate (900), is measured by the height detector (860). Based on this height data, the operation of the Z axis actuator (820) is controlled so that the wiring head (830) is positioned at an appropriate height by a control apparatus which is not depicted in the figure, and furthermore, so that the wiring head (830) is pushed against the wiring substrate (900) with a constant pressure during wiring.

The supply of the optical fiber (700) to the wiring head (830) of the wiring mechanism (800), and the wiring operation, will be explained with reference to FIG. 6. Here, FIG. 6 shows the state of the wiring head (830) in a series of wiring operations.

Figure 6A:
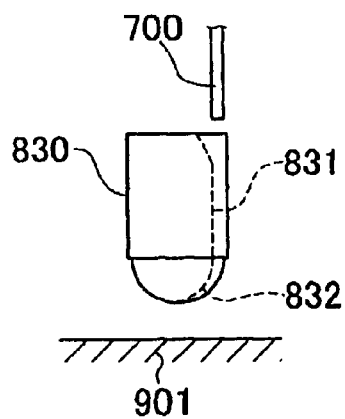
FIG. 6(a) is a side view showing the state of a wiring head in the prestage of the wiring operation, in a continuous wiring operation of the optical fiber wiring apparatus in the first embodiment of the present invention.

FIG. 6(a) shows the state of the prestage to the wiring operation. In this stage, the wiring head (830) is in the up position (the position of separation from the substrate).

Next, the optical fiber (700) is fed out by the optical fiber feed mechanism (400) and is fed into the guide groove (831) of the wiring head (830), and the lead end of the optical fiber (700) is extended to the substrate adhesive layer (901). Here, FIG. 6(b) shows the state at the initiation of wiring in which the wiring head (830) is upwardly positioned and the optical fiber (700) guided by the guide groove (831) is extended into contact with the substrate adhesive layer (901).

Figure 6D:
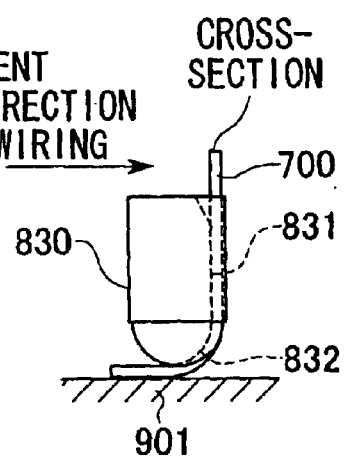
FIG. 6(d) is a side view showing the state of the wiring head during the wiring operation, in a continuous wiring operation of the optical fiber wiring apparatus in the first embodiment of the present invention.
Figure 6B:
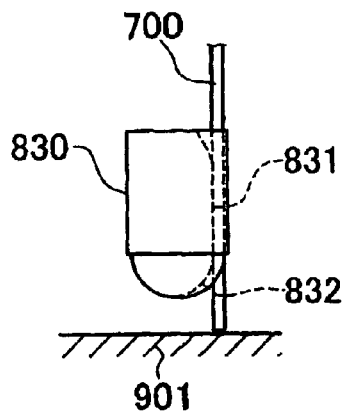
FIG. 6(b) is a side view showing the state of the wiring head at the initiation of wiring in a continuous wiring operation of the optical fiber wiring apparatus in the first embodiment of the present invention.
Figure 6E:
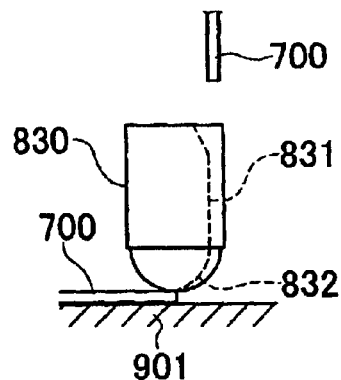
FIG. 6(e) is a side view showing the state of the wiring head during the wiring of the end of the optical fiber, in a continuous wiring operation of the optical fiber wiring apparatus in the first embodiment of the present invention.
Figure 6C:
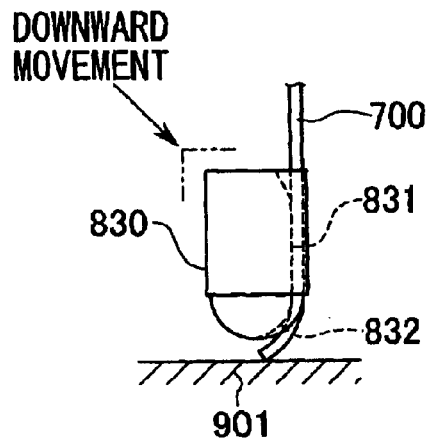
FIG. 6(c) is a side view showing the state of the wiring head immediately after the initiation of wiring in a continuous wiring operation of the optical fiber wiring apparatus in the first embodiment of the present invention.

Next, as shown in FIG. 6(c), progress is made in the direction of the wiring while lowering the wiring head (830), and the optical fiber (700) which is in projecting contact with the substrate adhesive layer (901) is incorporated into the pressure groove (832) while being bent. Here, optical fiber (700) is supported in a state in which it is constantly bent by the pressure groove (832), and is pressed onto the wiring substrate (900) by this bending stress.

Continuing, as shown in FIG. 6(d), the lowering of the wiring head (830) is halted at a position at which the optical fiber (700) is in contact with the substrate adhesive layer (901) directly below the wiring head (830), and transfer is effected to constant-pressure control, the wiring head (830) is advanced in the direction of wiring, and wiring is conducted.

Next, as shown in FIG. 6(d), the optical fiber cutting mechanism (500) is operated at a position having a length determined from the end of the wiring, and optical fiber (700) is cut, and as shown in FIG. 6(e), the wiring of the remainder up to the end of the wiring is executed.

Figure 6F:
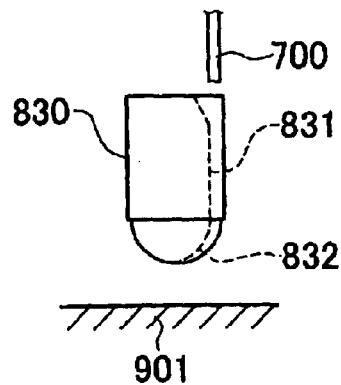
FIG. 6(f) is a side view showing the state of the wiring head at the termination of wiring, in a continuous wiring operation of the optical fiber wiring apparatus in the first embodiment of the present invention.

After the completion of wiring, as shown in FIG. 6(f), the wiring head (830) is withdrawn upwardly at the end of the wiring.

By repeating the operation described above a number times, it is possible to conduct the multiple wiring of optical fiber (700) using a plurality of patterns.

Here, prior to conducting the wiring operation described above, by moving the manipulator (300) along the wiring pattern in a state in which the drawing pen (850) is attached to the raising and lowering plate (340), it is possible to confirm the wiring pattern by means of a written record using a drawing pen (850) prior to the actual wiring operation of optical fiber (700).

Figure 5B:
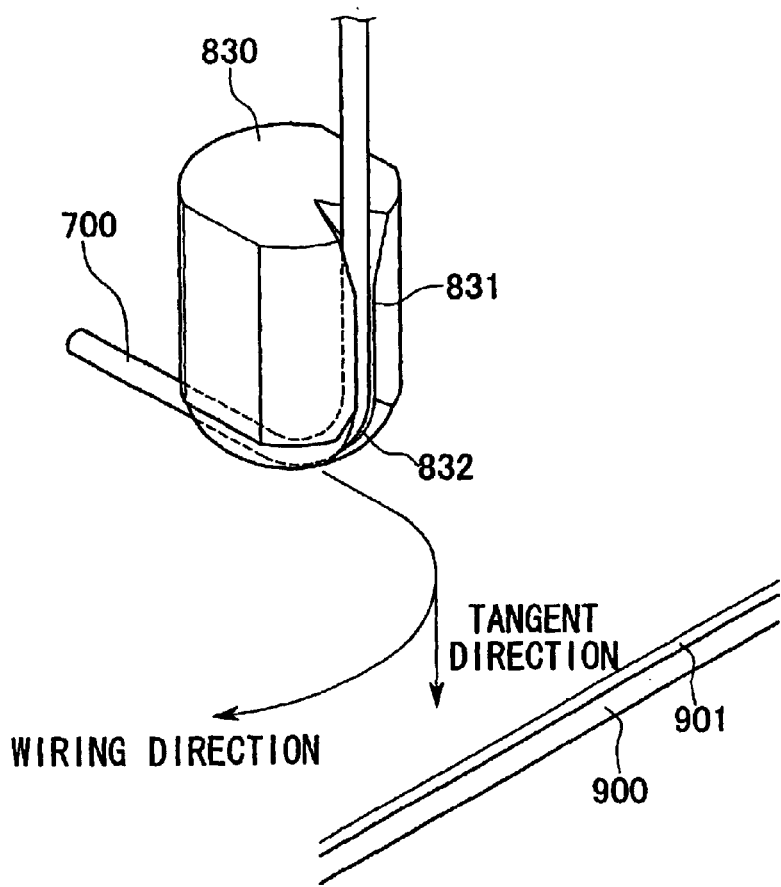
FIG. 5(b) is an enlarged angled view of essential parts showing the operation during wiring of the wiring head of the optical fiber wiring apparatus in the first embodiment of the present invention.

In this type of wiring operation of optical fibers, when a curved pattern is wired, as shown in FIG. 5(b), the orientation of the pressure groove (832) is set in the direction at a tangent to the wiring pattern, and thereby, it is possible to produce a high quality curved pattern. As explained above, the structure is such that the wiring mechanism (800) and the upper structure of the manipulator (300) are synchronously rotated by the Z axial rotation mechanism (600) and the upper and lower gears (323 and 342), so that even when the wiring head (830) is successively oriented in the direction of wiring in order to conduct curved wiring during the wiring operation, it is possible to conduct continuous operation without twisting the optical fiber (700) which is fed out.

Furthermore, when a curved pattern is wired, the pressure G of the optical fiber (700) by the wiring head (830) is set so as to be larger than the pressure G1 in the case in which the wiring of a pattern having no curves is conducted, and control may be exercised such that the holding power of the optical fiber (700) of the substrate adhesive layer (901) is larger. At this time, the wiring velocity V (the movement rate of the manipulator (300)) during the wiring of a pattern having curves may be set lower than the wiring velocity V1 of a pattern having no curves. By means of this, it is possible to increase the accuracy of wiring even when the wiring is of a pattern having curves.

Furthermore, when wiring parts which pass over previously installed optical fiber (700) (intersection parts of optical fiber (700)), the structure may be made such that the pressure G on the optical fiber (700) by the wiring head (830) is smaller than the pressure G2 at positions other than intersection parts. In this case, the pressure exerted on previously wired optical fibers when wiring a new optical fiber (700) is diminished, and it becomes less likely that the position of the previously installed optical fiber will be altered, so that the wiring pattern is less likely to become disordered at intersection points.

Furthermore, the optical fiber feed mechanism (400) feeds a stocked optical fiber (700) so as to maintain the deflection of the optical fiber (700) to be wired at a constant level, so that, in the wiring operation, the optical fiber (700) can be maintained in an essentially constant state between the wiring head (835) and the various optical fiber paths (optical fiber guides) connected thereto, and it is possible to conduct wiring in accordance with the designed pattern even at curved portions of the wiring pattern.

Accordingly, it is possible to realize optical fiber wiring which satisfactorily follows the wiring pattern in the same way as in the case of wiring of a straight line pattern, even where a curved pattern is wired.

Furthermore, the wiring head had a lower end which was made hemispherical, and furthermore, the wiring head was formed from a material having little friction resistance, so that the position of previously installed optical fiber is unlikely to be shifted, and damage caused, when passing over previously installed optical fiber (700).

Embodiment 2

Next, a second embodiment of the present invention will explained with reference to FIGS. 7 through 13.

The optical fiber wiring apparatus in the present embodiment has parts having a structure which is essentially the same as that of the optical fiber wiring apparatus shown in the first embodiment, and these parts will be explained using reference numbers which are the same as those in the first embodiment.

Figure 7:
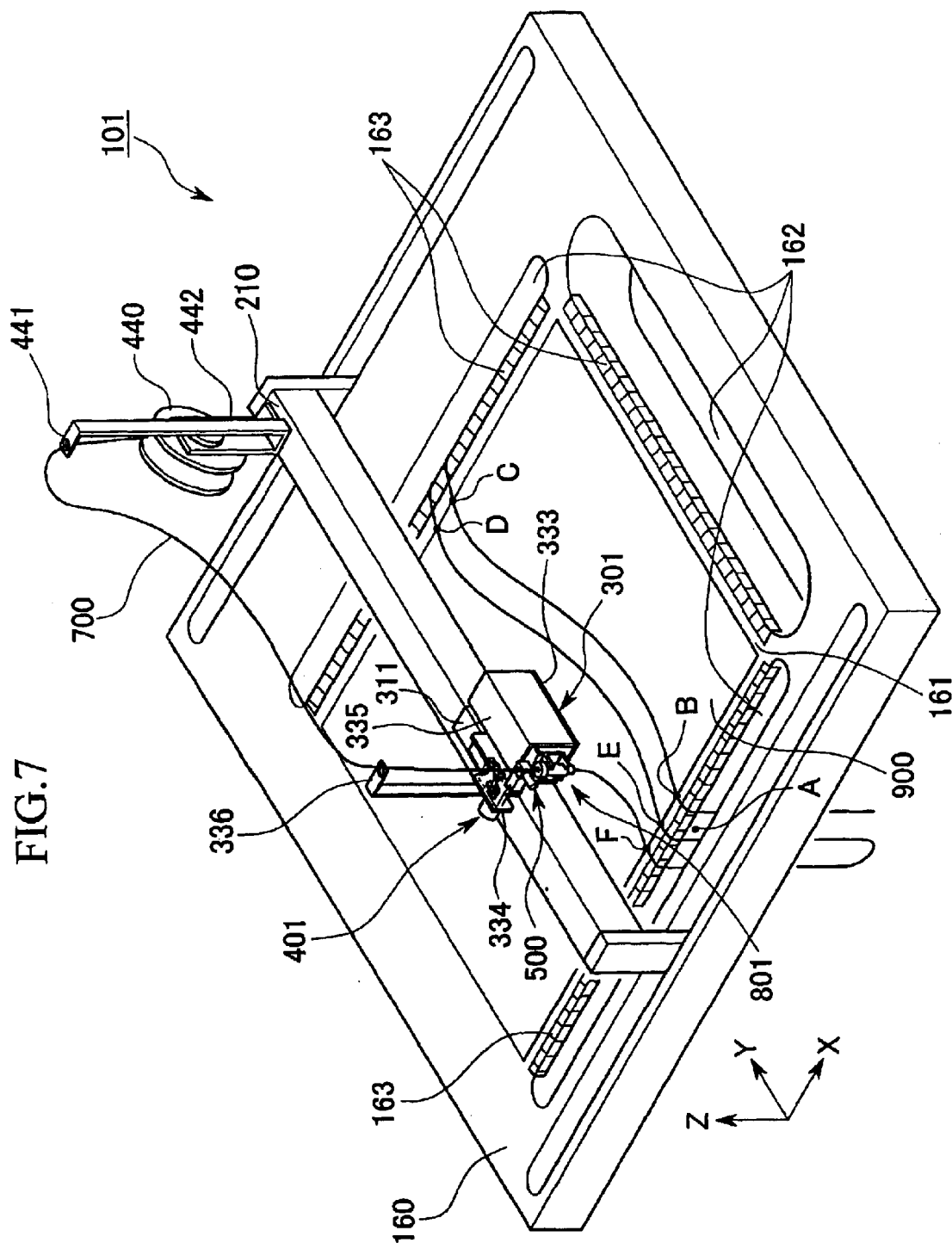
FIG. 7 is a structural diagram showing the entirety of the optical fiber wiring apparatus in accordance with a second embodiment of the present invention.

The optical fiber wiring apparatus (101) shown in FIG. 7 is provided with a table (160) which supports a wiring substrate (900). The table (160) is formed from a substrate support part (161), which supports the wiring substrate (900), and with drop holes (162) which adjoin the substrate support part (161). In the apparatus of this embodiment, the substrate support part (161) is rectangular, and furthermore, the drop holes (162) are provided along three sides of the substrate support part (161). Here, the number of drop holes provided may be freely selected; these may be provided along one or two sides of the substrate support part (161), or may be provided along all four sides thereof.

Optical fibers (700), which extend to the side from the wiring substrate (900) and are wired, as described hereinbelow, hang down from each drop hole (162) in table (160). Here, in the present embodiment, each drop hole (162) is provided in such a manner as to vertically penetrate the table (160), and by means of this, it is possible to hang optical fiber (700) of freely selected lengths within each drop holes (162) (here, each drop hole (162) may have a bottom).

Additionally, in table (160), among the peripheral part of each drop hole (162), the angled parts on at least the side of the substrate support part (161) are beveled and worked so as to be smooth, and by means of this, the optical fibers (700) which hang down from the drop holes (162) are not damaged (in addition to this, the inner wall surface of each drop hole (162) is processed so as to be smooth, so as to make it less likely that the optical fiber (700) will be damaged). Furthermore, in the apparatus of this embodiment, in table (160), adhesive tape is applied to each peripheral part of each drop hole (162) on the substrate support part (161) side so that the adhesive surface faces upward, and this forms a temporary stop part (163) which temporarily stops the optical fibers hanging down in the drop holes (162) at that part. Here, the temporary stop part (163) is not necessarily limited to adhesive tape; any member having adhesive properties may be employed.

A Y bar (210) is provided on table (160); this spans the table (160) in a transverse direction (a Y axial direction) and is moved in the X axis direction by a X axial movement mechanism which is not depicted in the figure. Furthermore, the manipulator (301) is attached to the Y bar (210) via a carriage (311), and the carriage (311) is moved in the Y axis direction along the Y bar (210) by a Y axial direction movement mechanism which is not depicted in the figure.

Additionally, the operation of the X axial direction movement mechanism and the Y axial direction movement mechanism is controlled by respective control apparatuses (not depicted in the figure), and these accept a combination of unit movement directives in the X axis direction and the Y axis direction of the control apparatuses (for example, directives for movement increments of 0.1 mm), and conduct movement in the X and Y directions. That is to say, the structure is such that the manipulator (301) which is attached to the Y bar (210) via the carriage (311) moves on the table (160) and the position thereof is controlled in the X axis direction and the Y axis direction.

Furthermore, a pattern creating apparatus (not depicted in the figure) which creates the wiring pattern of the optical fiber (700) is connected to the control apparatus, and the control apparatus conducts the control of the operation of the manipulator (301) based on the wiring pattern data created by the wiring pattern control apparatus.

Here, the X axis direction movement mechanism comprises, for example, a rack, which is provided along the X axis direction of the table (160), a pinion, which is provided so as to be rotatable in a state in which it is engaged with the rack provided on table (160) with respect to the Y bar (210), and a X motor which rotationally drives this pinion. In the same way, the Y axis direction movement mechanism also comprises a rack, which is provided along the longitudinal direction of the Y bar (210), a pinion, which is provided so as to be rotatable in a state in which it is engaged with the rack provided on the Y bar (210) with respect to a carriage (311), and a Y motor, which rotationally drives this pinion. Additionally, insofar as the positions of the Y bar (210) and the carriage (311) are made finely adjustable with a precision on the order, for example, of 0.1 mm, the X axis direction movement mechanism and the Y axis direction movement mechanism may have freely selected structures.

Figure 8:
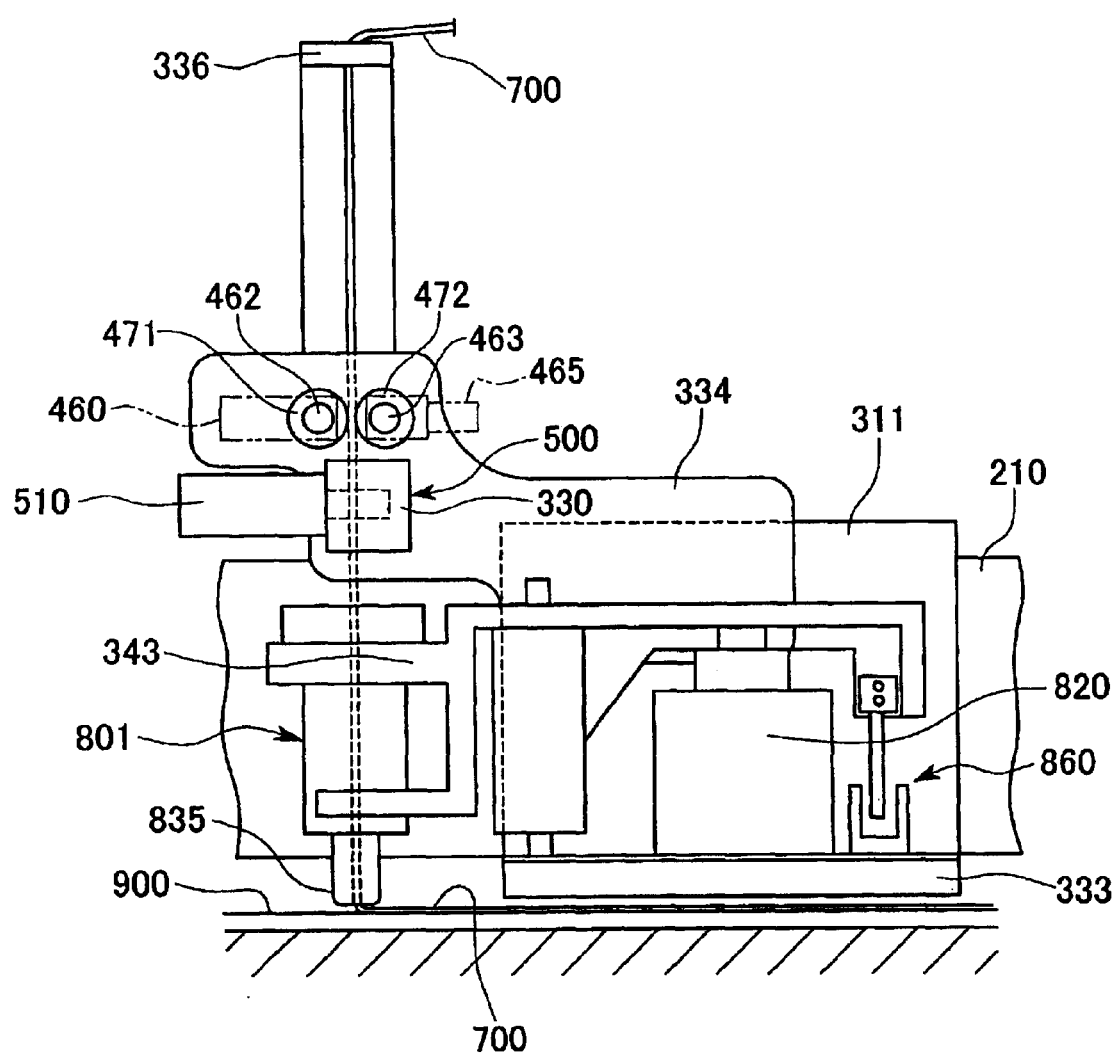
FIG. 8 is a front view showing the makeup of the manipulator of the optical fiber wiring apparatus in the second embodiment of the present invention.

As shown in FIG. 8, the manipulator (300) comprises a base (333), which is provided on a carriage (311), a wiring mechanism (801), which is provided above this base (333), an intermediate member support part (334), which is attached to the carriage (311) in a state in which a part thereof extends to the side direction of the carriage (311) (the negative direction along the Y axis in the apparatus of the present embodiment), an intermediate member (330), which is attached to the portion in the intermediate member support part (334) which extends to the side of the carriage (311), and a optical fiber cutting mechanism (500), which is incorporated into the intermediate member (330) and is disposed directly above the wiring mechanism (801); furthermore, a portion of the optical fiber feed mechanism (401) is provided in the intermediate member support part (334) at a position directly above the optical fiber cutting mechanism (500).

The central part of the carriage (311) is provided along the side surface of the Y bar (210), and the upper part thereof is bent in a direction above the Y bar (210), while the lower part thereof is bent so as to be oriented in a direction of separation from the Y bar (210), and the member is thus formed so that it has the shape of a hook (figure of Z) when viewed from the side. This carriage (311) has an upper part which is in contact with the upper surface of the Y bar (210), while the lower part thereof forms a base (333) to which the wiring mechanism (801) is attached. Furthermore, the intermediate member support part (334) is attached to the central part thereof.

As shown in FIG. 8, the wiring mechanism (801) is provided with, on the base (333), a raising and lowering plate (343), which is provided in such a manner that a portion thereof extends to the side of the base (333), a wiring head (835) which is attached to this raising and lowering plate (340) at the part which extends to the side of the base (333), a Z axis actuator (820), which raises and lowers the wiring head (835) by raising and lowering the raising and lowering plate (343), and a height detector (860), which detects the height of the wiring head (835) which is raised and lowered by the Z axis actuator (820).

Here, the raising and lowering plate (343) and the intermediate member support part (334) protrude in the same direction with respect to the carriage (311), that is to say, they protrude in the negative direction along the Y axis in the apparatus of the present embodiment.

In this embodiment, the Z axis actuator (820) is of a type that permits the adjustment of the amount of vertical displacement and the force with which vertical movement is conducted, by increasing or decreasing the current applied, and as described hereinbelow, this may also be used in the control of the optical fiber pressure of the wiring head (835) with respect to the wiring substrate (900).

Furthermore, a cover (335) is provided in the carriage (311), and by means of this cover (335), among the parts of the wiring mechanism (801), at least those parts positioned on the base (333) of the carriage (311) are covered. Furthermore, the cover (335) has an opening in the side surface thereof so as to permit the raising and lowering of the parts which extend to the side of the base (333) in the raising and lowering member (835) (in the apparatus of the present embodiment, the opening is in the side surface which faces the negative direction on the Y axis).

Figure 9:
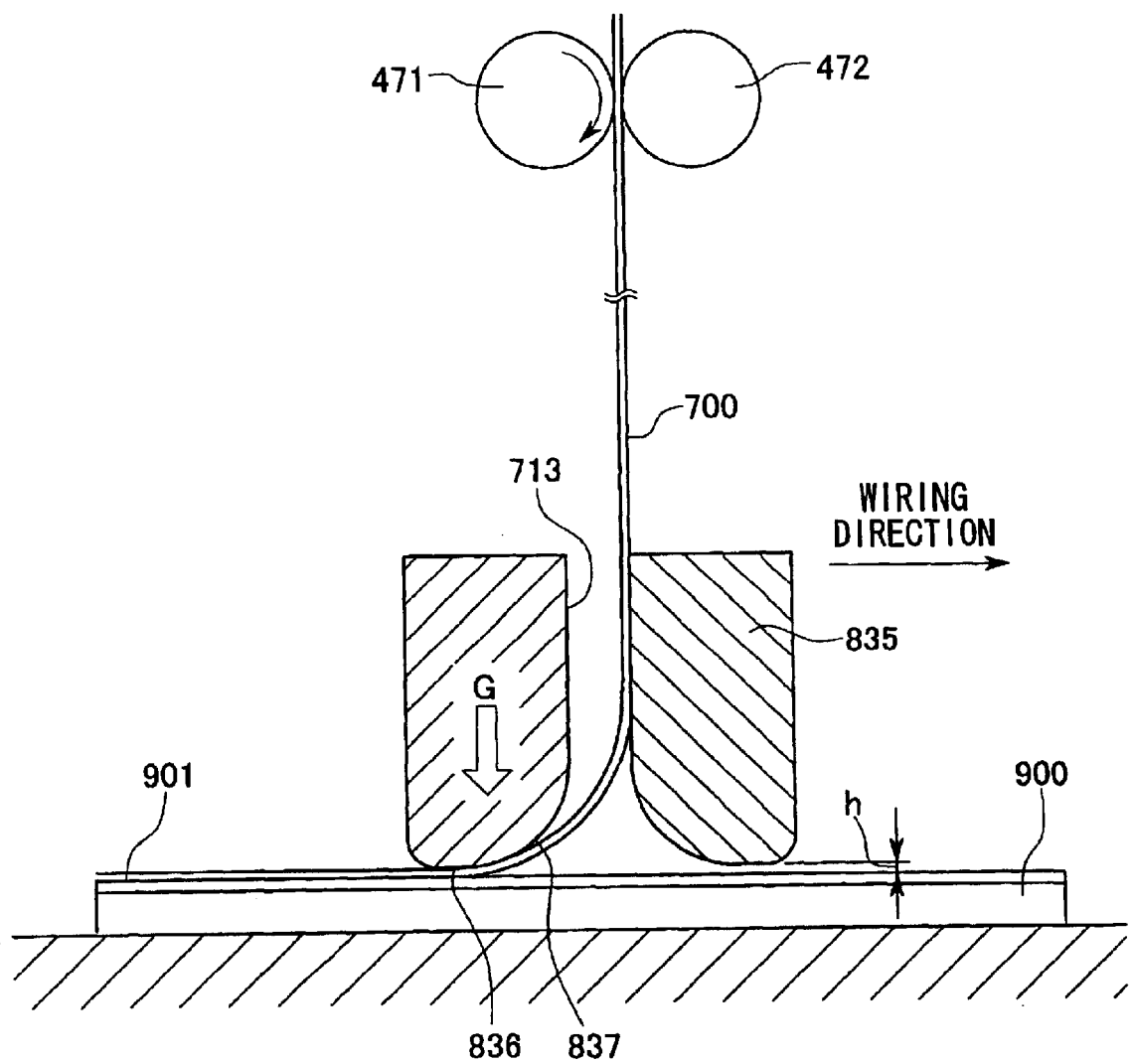
FIG. 9 is a typical diagram showing the state of the optical fiber, during wiring, of the optical fiber wiring apparatus of the second embodiment of the present invention.

As shown in FIG. 9, the wiring head (835) presses the optical fiber (700) which is fed from the optical fiber feed mechanism (401) onto the wiring substrate (900) on the table (160) by the lead end surface (836) thereof; the wiring head (835) is provided with an optical fiber path 4 (713), which guides the optical fiber (700) from the upper end thereof to the lead end surface (836), and a curved guide surface (837), which smoothly connects the lead end surface (836) with the inner surface of the optical fiber path 4 (713). In this way, the wiring head (835) is formed in the shape of a trumpet in which the inner diameter gradually increases from the optical fiber path 4 (713) to the lead end.

In the wiring head (835), the radius of curvature of the guide surface (837) is set on the order of 3 mm, and the optical fiber (700) which is inserted into the wiring head (835) is bent with a radius of curvature of approximately 3 mm along the guide surface (837) of the lead end surface (836). Furthermore, the wiring head (835) should be made from a material having a smaller coefficient of friction than the optical fiber (700), in the same manner as the wiring head (830) used in the apparatus of the first embodiment.

Figure 10:
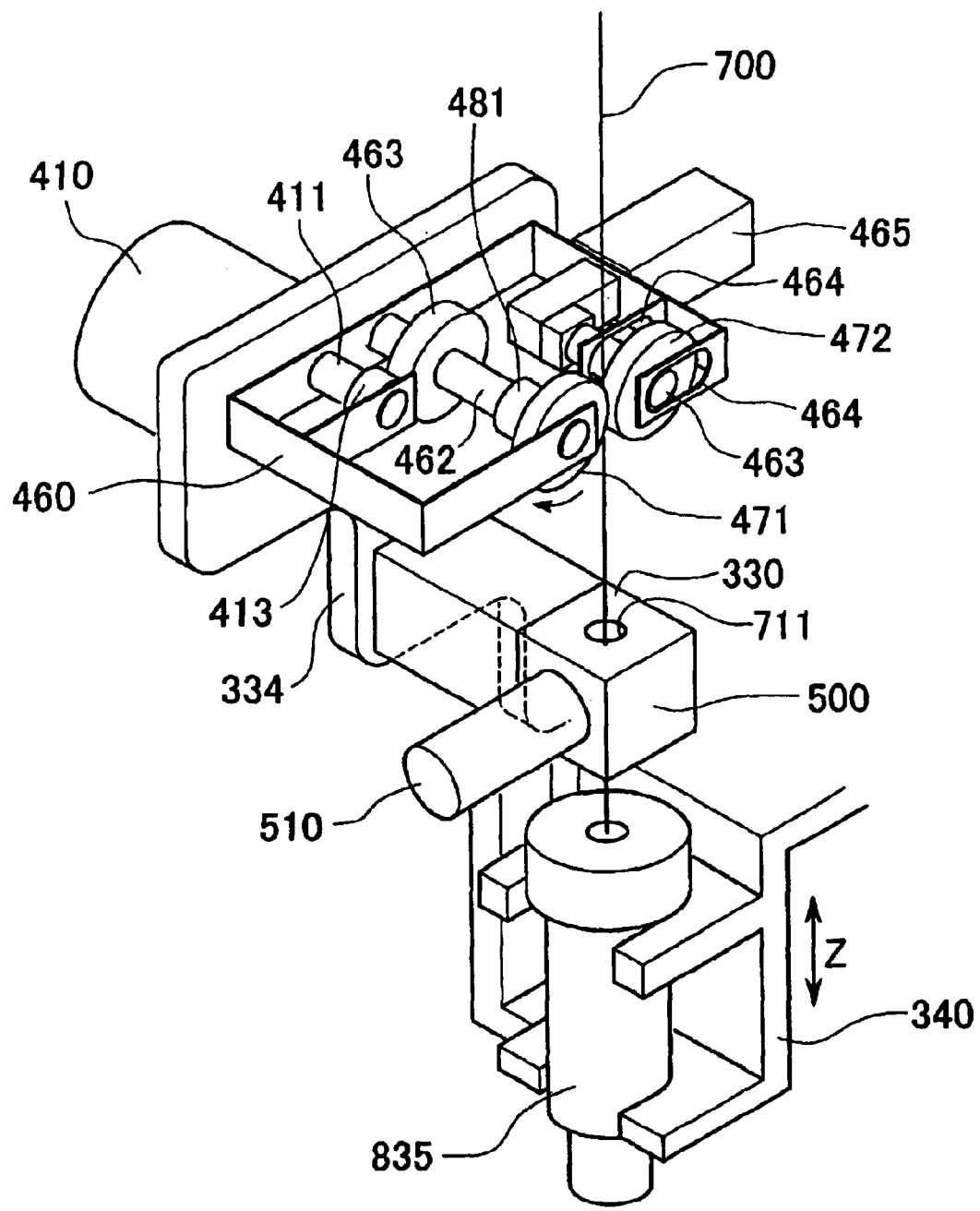
FIG. 10 is a perspective view showing the makeup of the manipulator of the optical fiber wiring apparatus in the second embodiment of the present invention.

As shown in FIG. 10, the optical fiber cutting mechanism (500) is, as in the apparatus of the first embodiment, incorporated in the intermediate member (330), and the intermediate member (330) is provided at a position above the wiring head (835).

Figure 11A:
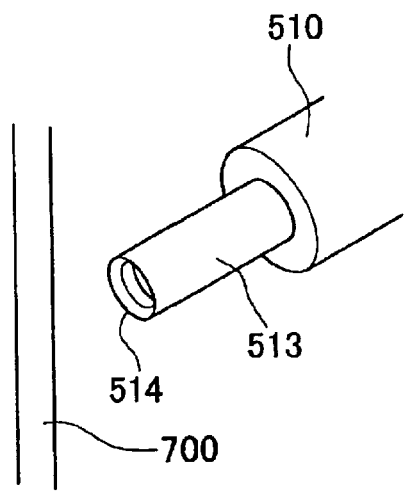
FIG. 11(a) is a perspective view showing the form of the cutter of the optical fiber cutting mechanism of the wiring apparatus in accordance with the second embodiment of the present invention.
Figure 11B:
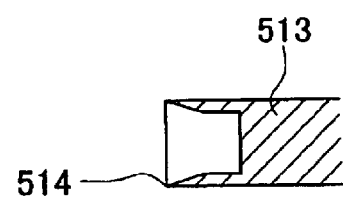
FIG. 11(b) is a side cross-sectional view showing the form of the cutter of the optical fiber cutting mechanism of the optical fiber wiring apparatus of the second embodiment of the present invention.

The optical fiber cutting mechanism (500) contains optical fiber path 2 (711) which is formed in the intermediate member (330), and a electromagnetic slider (510), which drives the cutter which cuts the optical fiber (700). Additionally, a cutter (513) having the shape shown by the perspective view of FIG. 11(a) and the side cross-sectional view of FIG. 11(b) is employed as the cutter. In other words, the end part of the cutter (513) of the present embodiment which faces the optical fiber (700) has an approximately tubular shape with an opening facing the optical fiber side, and the outer surface and the inner surface thereof meet at this end part to form an intersection ridge line which forms a cutting blade (514) (here, the cutter (511) which is depicted in the first embodiment may also be employed as the cutter).

Because the cutter (513) has this type of blade configuration, the cutting surface of the optical fiber (700) is less likely to be torn in comparison with the case in which a cutting blade having a straight edge is employed, and it is thus possible to cleanly cut the optical fiber (700). Accordingly, it is possible to continuously feed an optical fiber to the narrow guide groove (831) without stoppages during feeding.

This optical fiber cutting mechanism (500) cuts the optical fiber (700) within the optical fiber path 2 by the operation of the electromagnetic slider (510) in response to a directive from the control apparatus and the extension of the cutter (514) into the optical fiber path 2.

As shown in FIG. 7, the optical fiber feed mechanism (401) is provided with an optical fiber storage reel (440) which is provided at one end of the Y bar via a stay (442) and on which the optical fiber (700) is wound, a reel-side optical fiber support part (441) which guides the optical fiber (700) drawn from the optical fiber storage reel (440) above the optical fiber storage reel (440), and a head-side optical fiber support part (336) which is attached to the carriage (311) via the intermediate member support part (334), and which guides the optical fiber (700) which passes through the reel-side optical fiber support part (440) above the wiring mechanism (801).

The optical fiber storage reel (440) is supported in a rotatable manner with respect to Y bar (210) via a stay (442); by means of the tensile force received by the optical fiber (700), rotation is conducted in a direction in which the optical fiber (700) is unwound, and the optical fiber (700) Is thus fed out. Here, the amount of optical fiber (700) which may be wrapped on the optical fiber storage reel (440) is at least enough to conduct several wirings. Furthermore, the optical fiber storage reel (440) is formed of a lightweight material such as, for example, paper or the like, so as to minimize the inertial force during rotation and to make the feeding of the optical fiber (700) smooth.

Furthermore, the reel-side optical fiber support part (441) and the head-side optical fiber support part (336) position the optical fiber (700) fed from the optical fiber storage reel (440) above the Y bar (210), and serve to ensure the optical fiber (700) does not interfere with the movement of the manipulator (301). In the apparatus of the present embodiment, the reel-side optical fiber support part (441) and the head-side optical fiber support part (336) are formed by through holes in the respective upper ends, and guide the optical fiber (700) by inserting it into these through holes (in this reel-side optical fiber support part (441) and head-side optical fiber support part (336), the edges of the through holes are beveled so as not to damage the optical fiber (700)).

Furthermore, as shown in FIG. 8, optical fiber feed mechanism (401) is provided with a roller support mechanism (460) which is attached to the intermediate member support part (334) in such a manner as to be positioned above the optical fiber cutting mechanism (500), a feed roller (471) which is supported between the head-side optical fiber support part (336) and the optical fiber cutting mechanism (500) in such a manner as to be rotatable, about an axis oriented in an approximately horizontal direction, by roller support mechanism (460), a pinch roller (472) which is supported, by roller support mechanism (460), so as to be rotatable about its axis in a state in which its peripheral surface faces that of the feed roller (471), and a optical fiber feed motor (410) (not depicted in FIG. 8) which is attached to the intermediate member support part (334) and which rotationally drives the feed roller (471).

The optical fiber feed mechanism (401) causes the rotation of the feed roller (471) by the optical fiber feed motor (410) in a state in which the optical fiber (700) fed via the head-side optical fiber support part (336) is held between the feed roller (471) and the pinch roller (472), and thereby, draws an optical fiber (700) from the optical fiber storage reel (440) and feeds it in the direction of the wiring head (835).

Here, the operation of the optical fiber feed motor (410) is controlled by a control apparatus which is not depicted in the figure, and by means of this, the amount of optical fiber (700) fed into the wiring head (835) may be adjusted.

As shown in FIG. 10, roller support mechanism (460) is provided with a frame (461) which is attached to the intermediate support part (334), and a drive side rotational axle (462) which is attached coaxially with the feed roller (471), and a slave side rotational axle (463) which is attached coaxially with the pinch roller (472), are supported by frame (461) in such a manner as to be rotatable about their respective axes. In the apparatus of the present embodiment, the axes of the drive side rotational axle (462), the slave side rotational axle (463) and the drive axle (411) of the optical fiber feed motor (410) are provided so as to be roughly parallel.

In the present embodiment, the drive roller (413) is provided in a fixed manner on the drive axle (411) of the optical fiber feed motor (410), and a slave roller (473) is provided in a fixed manner on the drive side rotational axle (462) in such a way as to be coaxial therewith and so that the peripheral surface thereof is in contact with the peripheral surface of the drive roller (413). By means of this, the rotation of the drive axle (411) of the optical fiber drive motor (410) is transmitted to the drive side rotational axle (462) and this is further transmitted to the feed roller (471).

Furthermore, an encoder (not depicted in the figure) is provided on the optical fiber feed motor (410); this detects the amount of rotation of the drive axle (411) and sends this to a control apparatus which is not depicted in the figure. The operation of the optical fiber feed motor (410) is controlled by a control apparatus, and by means of this, the amount of rotation of the feed roller (471), that is to say, the amount of optical fiber (700) fed by the optical fiber feed mechanism (401), is controlled.

Here, a reverse rotation prevention mechanism (481), which ensures the relative rotation is in one direction only, is provided between the feed roller (471) and the drive side rotation axle (462). The reverse rotation prevention mechanism (481) allows the feed roller (471) to rotate relative to the drive side rotation axle (462) during rotation in the feed direction (the clockwise rotational direction in FIG. 8) of optical fiber (700), and this makes it possible to draw the optical fiber in the direction of the wiring head (831) even when the drive side rotation axle (462) is not rotated. Furthermore, when rotation is conducted in the opposite direction to the feed direction of the optical fiber (700), this mechanism regulates the relative rotation with respect to the drive side rotation axle (462) and prevents backfeed of the optical fiber (700). Here, a reverse rotation prevention mechanism (481) is employed which uses, for example, a one-way clutch or the like.

Furthermore, the slave side rotation axle (463) is supported on frame (460) so that it is displaceable in directions so as to approach or move away from the drive side rotation axle (462), and an urging mechanism (465), which urges the slave side rotation axle (463) toward the drive side rotation axle (462) while permitting rotation of the slave side rotation axle (463) about its axis, is provided between the frame (460) and the slave side rotation axle (463).

In the apparatus of the present embodiment, the bearing hole (464) which accepts the slave side rotation axle (463) in the frame (460) is formed so as to be an elongated hole which is longer in the direction of approach to or separation from the drive side rotation axle (462), and by means of this, the movement of the slave side rotation axle (463) becomes possible. The urging mechanism (465) comprises a bearing member, which receives the slave side rotation axle (463), and a spring type plunger or the like, which urges the bearing member in the direction of the drive side rotational axle (462). The urging mechanism (465) presses the slave side rotation axle (463) in the direction of the drive side rotation axle (462), and presses the pinch roller (472) against the feed roller (471) in a state in which the optical fiber (700) is held between the feed roller (471) and the pinch roller (472), and by means of this, this mechanism creates a frictional force between the optical fiber (700) and the feed roller (471).

Here, it is possible to use, as urging mechanism (465), an electromagnetic slider; a control apparatus controls the amount of movement of the slave side rotation axle (463) and the urging force. By means of this, the frictional force generated between the optical fiber (700) and the feed roller (471) may be adjusted to a size which is appropriate to the feeding of the optical fiber (700), and by separating the pinch roller (472) from the feed roller (471) by a predetermined distance and eliminating the frictional force, it is possible to remove control of the feed amount of the optical fiber (700) where necessary.

As described above, the optical fiber wiring apparatus (101) makes it possible to automate a series of the operations of wiring by installing an optical fiber feed mechanism (410), an optical fiber cutting mechanism (500), and a wiring mechanism (801) on a manipulator (301).

Next, the operation of the apparatus of the second embodiment which has the structure described above will be explained.

Figure 12:
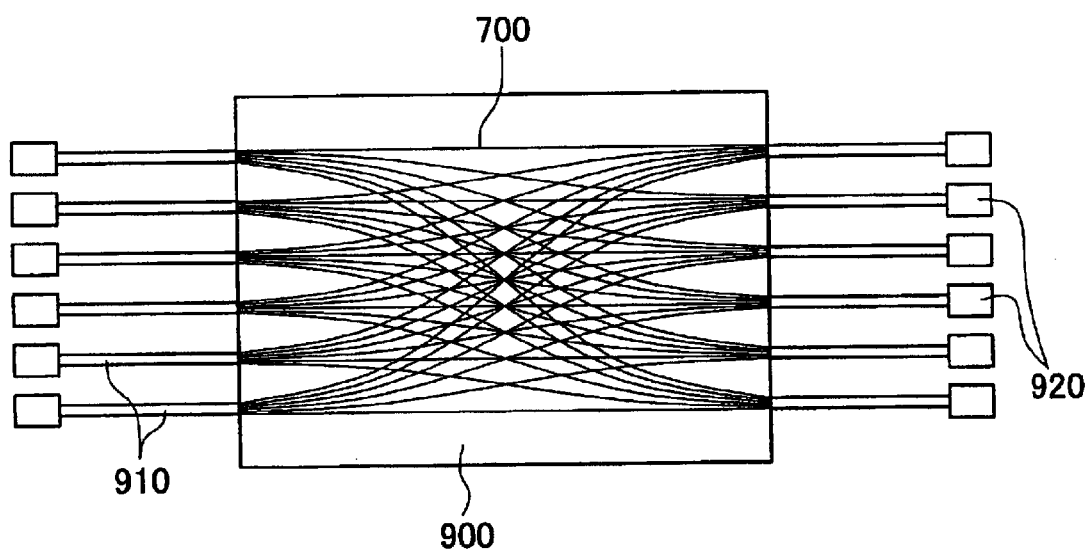
FIG. 12 is a front view showing an example of an optical wiring board produced by the optical fiber wiring apparatus of the second embodiment of the present invention.

The explanation will involve the case in which the optical wiring board shown in FIG. 12 is produced; that is to say, the case in which an optical wiring board is produced in which both ends of optical fibers forming a wiring pattern are extended for a predetermined length to the outside of one pair of sides of the wiring substrate (900).

Here, in optical fiber wiring apparatus (101), the control apparatus moves the manipulator (301) along a wiring pattern which is set by the wiring pattern creation apparatus, and the optical fibers (700) are thus wired in a predetermined pattern; the operation of the optical fiber wiring apparatus (101) can be conducted in an automated fashion as described below. Furthermore, the optical fiber (700) is supplied from the optical fiber feed mechanism (401) to the lead end of the wiring head (831) via the optical fiber cutting mechanism (500).

First, as shown in FIG. 7, a wiring substrate (900) is set on the substrate support part (161) of the table (160), and furthermore, a wiring pattern (see FIG. 12) is established by the wiring pattern creation apparatus. Based on this wiring pattern data, the control apparatus moves the Y bar (210) and carriage (311), and thus moves the manipulator (301) so that the wiring head (835) faces a point A directly above a drop hole (162) adjacent to the wiring initiation point B.

At this time, the optical fiber feed mechanism (401) supports the optical fiber (700) between a pinch roller (472) and the feed roller (471), and the rotation of the feed roller (471) is regulated by the reverse rotation prevention mechanism (481) so that it is in the opposite direction from the feed direction of the optical fiber, so that the feed roller (471) and the pinch roller (472) function as a stopper regulating the back-feed of the optical fiber (700). Accordingly, even when the manipulator (301) is moved in a direction of separation from the optical fiber storage reel (440), the optical fiber (700) is supported so that it is not returned to the optical fiber reel (440). At this time, the optical fiber (700) is fed out in an appropriate length from the optical fiber reel (440) in accordance with the movement of the manipulator (301), so that the optical fiber does not interfere with the manipulator (301).

Additionally, when the wiring head (835) of the wiring mechanism (801) is positioned at a position facing the point A, the control apparatus drives the optical fiber feed motor (410) of the optical fiber feed mechanism (401) and causes the feed roller (471) to rotate in the direction of feed of the optical fiber (700). By means of this, the optical fiber (700) which is held between the feed roller (471) and the pinch roller (472) is drawn from the optical fiber storage reel (440), and hangs down within the drop holes (162). The control apparatus manages the rotational amount of the optical fiber feed motor (410) based on the signal sent from the encoder, calculates the amount of rotation of the feed roller (471) from this amount of rotation, and calculates the feed amount of the optical fiber (700) from the rotational amount of the feed roller (471).

In this way, the control apparatus manages the feed amount of the optical fiber (700), and controls the length of the optical fiber (700) which is drawn from the wiring substrate (900).

Then, the control apparatus stops the rotation of the feed motor (401) at a point in time at which the amount of optical fiber (700) hanging down within the drop holes (162) reaches a predetermined value. Then, in this state, it moves the manipulator (300), and positions the wiring head (835) at a position facing the wiring initiation point B on the wiring substrate (900). At this time, the optical fiber (700) hanging down from the lead end of the wiring head (835) is also moved in the direction of point B; this optical fiber (700) comes into contact with the temporary stop (163) provided at the peripheral part of the drop holes (162) in the table (160), and is temporarily stopped in a state in which a predetermined length thereof extends to the side of the wiring substrate (900).

Next, the Z axis actuator (820) of the wiring mechanism (801) is driven by the control apparatus and slowly lowers the wiring head (835), and control is conducted such that, at the point B, the height is an appropriate wiring height h (see FIG. 9), and furthermore, the pressure thereof is an appropriate value (described hereinbelow).

Furthermore, in this case, the feed motor (410) of the optical fiber feeding mechanism (401) is stopped; however, the feed roller (402) is made capable of freely rotating in a direction so as to feed, in a downward direction, the optical fiber (700) by means of the reverse rotation prevention mechanism (481), so that, even in the case in which insufficiencies are caused in the optical fiber (700) which is temporarily stopped, it is possible to draw an amount corresponding to this insufficiency from the optical fiber storage reel (440).

The above operations are conducted in the process of arriving at point B, and from the state in which the wiring head (835) has been positioned above the point B, wiring is initiated between point B and point C.

At the wiring initiation point B on the wiring substrate (900), the optical fiber (700) inserted within the optical fiber path 4 (713) of the wiring head (835) is guided to the lead end surface (836). The control apparatus operates the Z axis actuator (820) in this state, and the wiring head (835) is lowered, and the optical fiber (700) is pressed against the substrate adhesive layer (901) with an appropriate pressure by the lead end surface (836) of the wiring head (835). Then, in this state, the manipulator (301) is moved and the wiring head (835) is moved in the direction of wiring, and thereby, the wiring of the optical fiber (700) is carried out.

In the wiring operation, the control apparatus continues to conduct the control of the Z axis actuator (820), and adjusts both the pressure with which the optical fiber (700) is pressed against the wiring substrate (900) by the wiring head (835), and the height of the wiring head (835), in accordance with the wiring pattern, so that the wiring of the optical fiber (700) is appropriately conducted.

Here, in the optical fiber wiring apparatus (101), the wiring head (835) moves relative to the wiring substrate (900) while pressing the optical fiber (700) against the wiring substrate (900) using the lead end surface (836), and thereby, the optical fiber (700) within the wiring head (835) is progressively drawn onto the wiring substrate (900). Furthermore, on the other hand, the operation of the optical fiber feed motor (410) is controlled by the control apparatus, and the feed roller (471) is caused to rotate so that, at each unit movement directive of wiring head (835) with respect to the pattern to be wired, a length of optical fiber (700) which takes into account the wiring of the unit movement directive is fed successively in advance of the directive into the optical fiber path of the wiring head (835).

For this reason, during the wiring operation, the tension on the optical fiber (700) in the optical fiber path 4 (713) from the lead end surface (836) of the wiring head (835) to the feed roller (471) of the optical fiber feed mechanism (401) is essentially fixed, and the feeding of the optical fiber (700) is stable, so that it is possible to maintain a standard wiring quality.

In the apparatus of the present embodiment, the wiring track of each wiring pattern (that is to say, the movement track of the manipulator (300)) is set in advance by the wiring pattern setting mechanism, and it is possible to calculate the combination of unit movements necessary to conduct wiring between points B and C and the length of optical fiber necessary for each unit movement.

Here, the data relating to the length of optical fiber necessary for each unit movement may be calculated in the control apparatus from the wiring pattern established by the wiring pattern setting mechanism, or these data may be inputted into the wiring pattern setting mechanism together with the wiring pattern data during the setting of the wiring pattern.

Furthermore, in the apparatus of the present embodiment, the feed roller (471) which is rotated by the optical fiber feed motor (410) is attached to the drive side rotation axle (462) via reverse rotation prevention mechanism (481), and this permits rotation in a direction such as to feed the optical fiber (700) to the drive side rotation axle (462). By means of this, even in cases in which, for some reason, the amount of optical fiber (700) fed by the feed roller (471) and the pinch roller (472) is insufficient, the necessary amount is drawn in the direction of the wiring head (835) irrespective of the operation of the optical fiber feed motor (410), so that it is possible to continue without delay.

Figure 13:
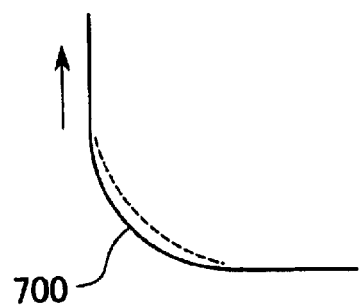
FIG. 13 is a diagram showing a curved portion of a wiring pattern wired by the optical fiber wiring apparatus of the present invention.

Furthermore, in the case in which the wiring of a curved pattern such as that shown by the solid line in FIG. 13 is conducted, as a result of the resistance during the drawing of the optical fiber (700) from the optical fiber feed mechanism (401), as shown by the dotted line in FIG. 13, the optical fiber (700) is likely to be wired in such a manner as to deviate from the desired pattern; however, at this time, the feed amount of the optical fiber (700) by the feed roller (471) and the pinch roller (472) may be set so as to be slightly greater than each unit movement directive of the corresponding wiring pattern. In this case, the optical fiber (700) is smoothly drawn in accordance with the movement of the wiring head (835), and it is possible to ensure the accuracy of the curved pattern without reducing the wiring speed.

Furthermore, when a curved pattern is wired, control may be conducted so that the pressure G on the optical fiber (700) exerted by the wiring head (835) is larger than the pressure G1 when conducting wiring of a pattern having no curves, thus increasing the holding power of the optical fiber (700) on the substrate adhesive layer (901). At this time, the wiring velocity V (the movement rate of the manipulator (301)) when wiring a pattern having curves may be set so as to be lower than the wiring velocity V1 of a pattern having no curves. By means of this, it is possible to increase the accuracy of wiring even when a curved pattern is wired.

Additionally, the wiring of the optical fiber (700) to the point C is accomplished as described above, and even after the wiring head (835) reaches the point C, the manipulator continues to move, and the wiring head (835) is moved to a position above the drop hole (162) which is adjacent to point C (the drop hole (162) on the side opposite to the previous drop hole). Then, at this position, the optical fiber feed mechanism (401) is operated, and a predetermined length of optical fiber (700) hangs down within this drop hole (162), and the wiring of the pattern is thus completed.

Then, if the necessary length of optical fiber (700) has been drawn out at the terminus of the wiring pattern, a transition occurs to the wiring operation between points D and E. The wiring operation between points D and E is an operation which is essentially the same as the wiring operation between points B and C which was explained above, with the exception that it is in the opposite direction.

Here, when the wiring is to be conducted of parts in which a previously wired optical fiber (700) is passed over (intersection parts of the optical fiber (700)), then the pressure G on the optical fiber (700) exerted by the wiring head (835) may be set so as to be smaller than the pressure G2 at positions other than the intersection position. In this case, the pressure with which a previously wired optical fiber is pressed when wiring a new optical fiber (700) is reduced, and the position of the previously installed optical fiber is less likely to shift, and thus the wiring pattern is less likely to become distorted at the intersection point.

Wiring is conducted in the manner described above onto a wiring substrate (900) in accordance with a wiring pattern set in advance by a wiring pattern setting mechanism.

Next, after the terminus of the final pattern within the total wiring pattern has been caused to hang down in the drop hole (162), the optical fiber (700) is cut by the optical fiber cutting mechanism (500), and the terminus is dropped into the drop hole (162), and the wiring of the optical fiber is completed. Next, after this, the parts of the optical fiber (700) hanging down within each drop hole (162) are severed, and thereby, a wiring board in which the end parts of optical fibers (700) forming each pattern extend to the sides of the wiring substrate (900) is completed.

After the wiring of the optical fiber is completed in this way, the Z axis actuator (820) of the manipulator (301) is operated, and the wiring head (835) is lifted to its uppermost position, and in this state, the optical fiber feed motor (410) is caused to rotate, and the lead end of an optical fiber (700) within the optical fiber path 2 (711) of the optical fiber cutting mechanism (500) is fed into the wiring head (835), and after this, it is possible to conduct preparations for the wiring operations onto another wiring substrate (900).

In the second embodiment described above, a method was discussed in which each wiring was conducted continuously (in the state in which the optical fiber (700) hanging down within each drop hole (162) was connected); however, by operating the optical fiber cutting mechanism (500) at a position above the drop hole (162) corresponding to each wiring operation, and severing the optical fiber (700) for each pattern, then after the completion of the wiring operation, it is possible to omit the cutting operation in which an operator is required to cut the optical fiber (700) which is connected at each pendent portion.

As shown in FIG. 12, with respect to the wiring substrate (900) on which the wiring operation has been completed, the optical fibers (700) which are in the state of wires outside the substrate (900) are taped in groups, and form multiconductor tape optical fibers (910). Then, multiconductor connectors (920) are connected to the lead ends thereof, and the optical wiring board is completed.

Figure 14:
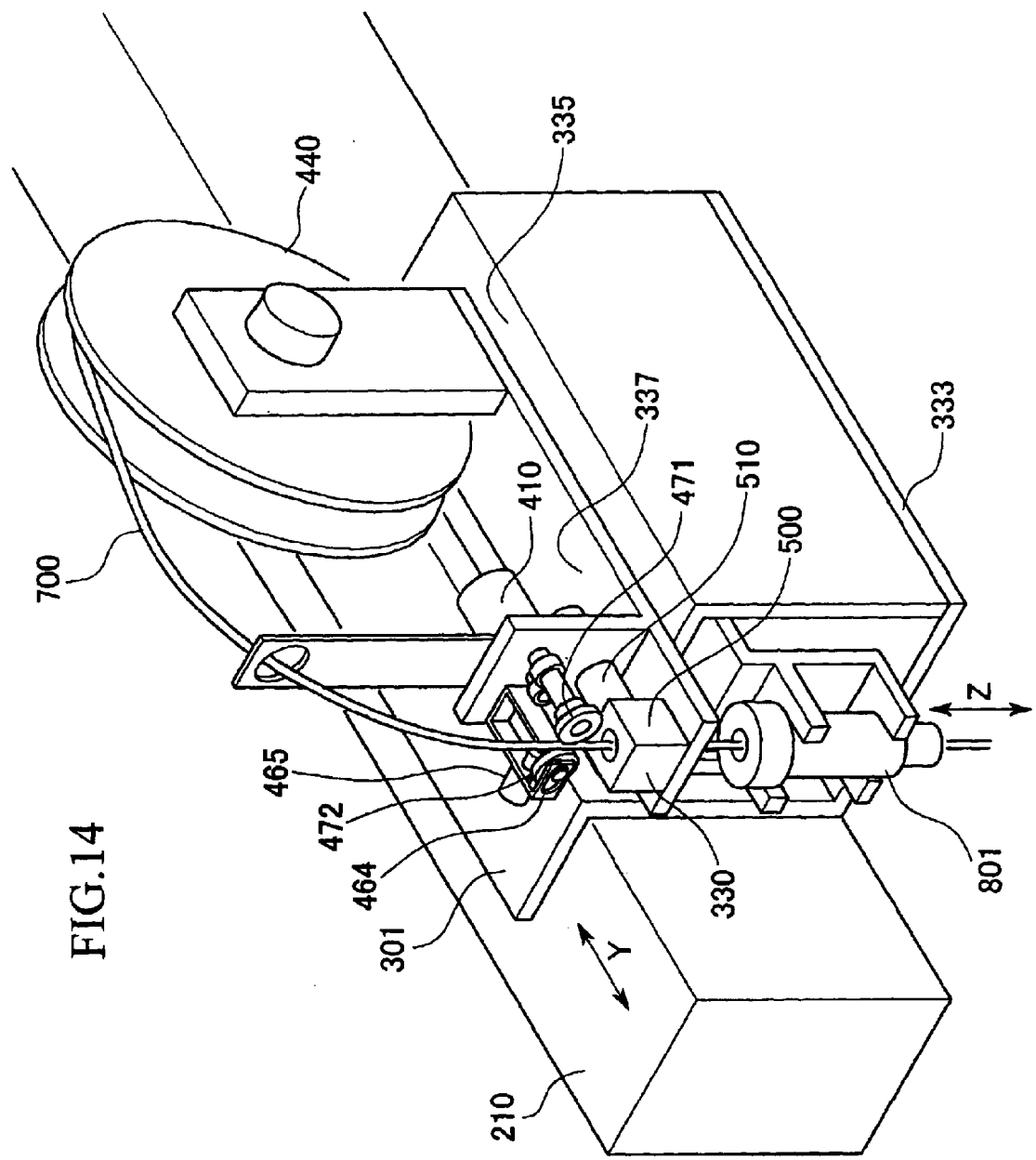
FIG. 14 is a perspective view showing the makeup of the manipulator of an optical fiber wiring apparatus in a third embodiment of the present invention.

Next, an apparatus of a third embodiment of the present invention will be explained with reference to FIG. 14.

The optical fiber wiring apparatus (102) which is the apparatus of the third embodiment employs, in the optical fiber wiring apparatus (101) disclosed in the second embodiment above, an intermediate member support part (337) which is provided on the cover (335) and a portion of which extends over the wiring head (835) at the side of the cover (335).

Additionally, in the apparatus of the present embodiment, as the optical fiber feed mechanism, an optical fiber feed mechanism (402) is employed in which, in the optical fiber feed mechanism (401), the optical fiber storage reel (440) is disposed not on the Y bar (210), but on the intermediate member support part (337), via a stay (442), and the reel-side optical fiber support part (441) is eliminated.

Additionally, the optical fiber storage reel (440) is provided so as to be rotatable in a plane parallel to a straight line connecting the optical fiber storage reel (440) and the wiring head (835), and by means of this, the rotational resistance of the optical fiber storage reel (440) during the drawing of the optical fiber (700) can be reduced, and it is possible to feed the optical fiber (700) smoothly.

In an optical fiber wiring apparatus (102) having this structure, the wiring of the optical fiber (700) is conducted in a manner essentially identical to that of the optical fiber wiring apparatus (101) shown in the second embodiment.

In accordance with this optical fiber wiring apparatus (102), the optical fiber storage reel (440) is provided on the manipulator (301) together with the wiring mechanism (801), and during the wiring of the optical fiber (700), this reel moves together with the manipulator (301), so that even if the manipulator (301) moves, the length of the optical fiber (700) drawn from the optical fiber storage reel (440) to the lead end of the wiring head (835) does not change, so that it is possible to smoothly conduct the control of the feeding of the optical fiber (700) by the optical fiber feed mechanism (402), and it is thus possible to conduct more accurate optical fiber (700) wiring.

Here, in both the second and third embodiments described above, sensors are provided to detect the presence or absence, or the amount, of optical fiber (700) stocked on the optical fiber reel (440), and when the optical fiber (700) runs out, or when an insufficient amount of optical fiber is present to complete the following wiring, a warning mechanism is provided which warns the operator to that effect.

Furthermore, in each of the apparatuses of the embodiments described above, the optical fiber cutting mechanism (500) employed a cutter; however, this is not necessarily so limited, and it is also possible to use a fiber clipper (produced by York Co., FK 11) which is commercially available and employs ultrasound.

Furthermore, in order to produce an optical wiring board in which the end parts of the optical fibers (700) forming the wiring pattern extend by a certain length to the sides of the wiring substrate (900), in the second and third embodiments described above, drop holes (162) were provided in the table (160) so that the optical fibers (700) which extended to the side of the wiring substrate (900) could hang down, and these examples minimized the space required for the operation. However, this is not necessarily so limited, and the drop holes (162) may be eliminated from the table (160), and by making the manipulator (301) movable to the outside of the substrate support part (161) and moving the manipulator (301) to a predetermined distance outside the substrate support part (161) while feeding the optical fiber (700) from the wiring head (835), a predetermined length of optical fiber (700) may be fed to the side of the wiring substrate (900).

Furthermore, the elements comprising each of the embodiments described above may be mutually combined. For example, the table (160) disclosed in the second embodiment may be employed in the optical fiber wiring apparatus shown in the first embodiment. Furthermore, in each of the embodiments described above, an optical fiber wiring substrate was employed which had an adhesive layer on the surface thereof; however, this is not necessarily so limited, and the following methods may also be adopted.

a) A structure (method) in which, in the optical fiber wiring apparatus, an adhesive application apparatus (optical fiber affixing mechanism) is provided in the vicinity of the wiring head, and when the optical fiber to be wired is wired, adhesive is applied to the wiring substrate.

b) A structure in which an adhesive (optical fiber affixing mechanism) is provided in advance on the optical fibers to be wired themselves.

In this case, it is desirable that an adhesive be employed which generates an appropriate amount of adhesive force when an appropriate pressure is applied.

The present invention is not limited to the embodiments described above; various modifications are included.

Here, in the optical fiber wiring apparatus shown in the various embodiments above, the following experiments were conducted in order to calculate an appropriate range of pressure G with which the optical fiber is pressed onto the wiring substrate by the wiring head.

In the optical fiber wiring apparatus shown in the second and third embodiments, the radius of curvature of the guide surface (837) of the wiring head (835) is normally approximately 3 mm. In order to conduct satisfactory wiring, it is necessary that the optical fiber (700) essentially follow (go along) the guide surface (837) of the wiring head (835). In the same way, in the wiring head (830) of the optical fiber wiring apparatus shown in the first embodiment, it is necessary that the optical fiber (700) essentially follow the bottom surface of the pressure groove (832).

In order to overcome the reaction force with which the optical fiber pushes against the wiring head when bent and to reliably bring the optical fiber to be wired into contact with the wiring substrate, it is necessary that the pressure G applied to the wiring head be at a certain value or higher.

Figures 15, 16:
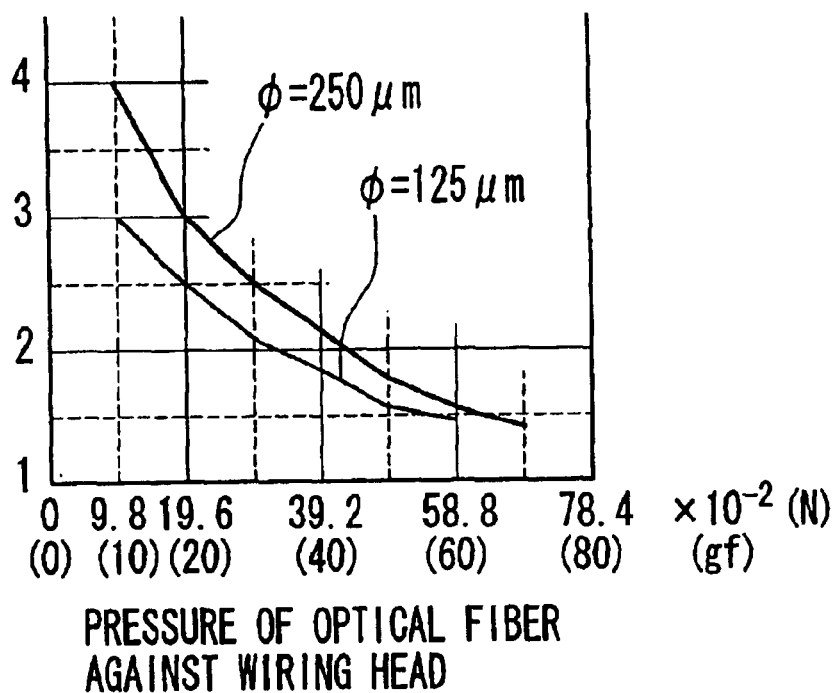
FIG. 15 is a graph showing the relationship between the radius of curvature and the curving stress when the optical fiber bends.
FIG. 16 is a table showing the relationship between the pressure on the optical fiber resulting from the wiring head and the quality of the wiring.

In order to calculate the minimum value of this pressure G, the relationship between the radius of curvature (mm) when optical fibers commonly employed in this type of wiring apparatus having a diameter $\phi$ of 250 $\mu$m and a diameter $\phi$ of 125 $\mu$m are respectively bent, and the reaction force (N) ((gf)) produced by the optical fibers at this time which is applied to the wiring head, was determined. The results thereof are shown are shown in the graph of FIG. 15.

It can be seen from this graph that when the radius of curvature of the guide surface (837) of the wiring head (or the radius of curvature of the bottom surface of the pressure groove (832)) is approximately 3 mm, then in order to conduct satisfactory wiring, it is necessary that the pressure G applied to the optical fiber (700) by the wiring head be at least $9.8 \times 10^{-2}$ (N) (10 (gf)).

Furthermore, when wiring of optical fibers is conducted over previously wired optical fibers, as in multiple wirings, when the pressure G applied to the optical fiber (700) by the wiring head is too large, then the optical fiber which was previously wired is moved, and there is a danger that the pattern may break down.

In order to determine the maximum value of this pressure G, multiple wirings were conducted while changing the pressure G of the wiring head, and the disarray of the pattern was considered in each case.

In the table shown in FIG. 16, the relationship is shown between the size of the pressure G of the wiring head, which was determined as described above, and the frequency of pattern failure during multiple wirings in these cases. As can be seen from this table, when the pressure G of the wiring head (835) was less than approximately 2.0 (N) (200 (gf)), there was no pattern failure at all, so that it was learned that the maximum force G applied by the wiring head to the optical fiber (700) was 2.0 (N).

From the results of the experiment described above, it was learned that, in order to conduct satisfactory wiring, the range of the pressure G applied to the optical fiber (700) by the wiring head was $9.8 \times 10^{-2}$ (N)$\leq$G$\leq$2.0 (N) (10 (gf) $\leq$G$\leq$200 (gf)).

What is claimed is:

1. An optical fiber wiring apparatus for wiring substrate, comprising:
    a wheel-less wiring head which guides an optical fiber to a lead end thereof along a guide groove through which the optical fiber slides into position on the wiring substrate, the guide groove extending partially along a length of the wiring head and formatting an optical fiber path;
    an optical fiber feed means which feeds said optical fiber during the wiring operation into said optical fiber path of said wiring head;
    an optical fiber contact means, which brings an optical fiber, which has been guided to said lead end of said wiring head via said optical fiber path, and said wiring substrate into contact, wherein the optical fiber contacting the means includes an optical fiber pressing means for pressing said optical fiber against said wiring substrate with a predetermined pressure;

an XY movement means, which moves said wiring substrate and said wiring head relative to one anther in the X and Y directions in the state in which said optical fiber at said lead end of said wiring head has been placed in contact with said wiring substrate by said optical fiber contact means; and an optical fiber affixing means, which successively affixes, to said wiring substrate, said optical fiber which has been brought into contact with said wiring substrate during movement by said XY movement means, wherein in the wheel-less wiring head, a pressure groove connected to said guide groove is formed with a radius of curvature larger than the radius of curvature at which said optical fiber breaks, so as to support the optical fiber in a state in which it is bent by a fixed amount and is pressed onto said wiring substrate.

2. An Optical fiber wiring apparatus in accordance with claim 1 wherein said optical fiber within said optical path of said wheel-less wiring head is successively drawn out when the optical fiber at the end of said wheel-less wiring head is successively affixed by said optical fiber affixing means, and said optical fiber feed means feeds said optical fiber stocked in said optical fiber path which successively draws out said optical fiber.

3. An optical fiber wiring apparatus accordance with claim 2, wherein said optical fiber feed means is provided with a deflection detection means for detecting deflection of said optical fiber within said optical fiber path of said wheel-less wiring head or in a path leading to this optical fiber path, and a deflection maintaining means for maintaining the deflection within a predetermined range based on detection values of said deflection detection means.

4. An optical fiber wiring apparatus in accordance with claim 1, wherein at least said lead end of said wheel-less wiring head has a hemispherical shape and the guide groove guides said optical fiber to the hemispherical part, said pressure groove is formed in said hemispherical part, and said optical fiber is guided to the lead end of said wheel-less wiring head via said guide groove and said pressure groove.

5. An optical fiber wiring apparatus in accordance with claim 4, wherein a Z axial rotation means, which rotates said wheel-less wiring head about the Z axis in accordance with a wiring pattern, and orients said pressure groove of said wheel-less wiring head in a direction in which wiring is to be conducted during the wiring operation, is provided.

6. An optical fiber wiring apparatus in accordance with claim 5, wherein said Z axial rotation means is provided with a rotational reference sensor for orienting said pressure groove of said wheel-less wiring head in the direction in which wiring is to be conducted.

7. An optical fiber wiring apparatus in accordance with claim 1, wherein said optical fiber feed means feeds an amount of optical fiber necessary during various successively executed wirings successively into the optical fiber path of said wheel-less wiring head.

8. An optical fiber wiring apparatus in accordance with claim 7, wherein said optical fiber feed means is provided with a reverse rotation prevention means which prevents back feeding of said optical fiber and which conducts drawing out of the optical fiber in the direction of feeding without resistance.

9. An optical fiber wiring apparatus in accordance with claim 8, wherein said reverse rotation prevention means is a one-way clutch.

10. An optical fiber wiring apparatus in accordance with claim 1, wherein said optical fiber contacting means is provided with a Z axis actuator which displaces said wheel-less wiring head in a Z axial direction, and displaces said wheel-less wiring head in the direction of said wiring substrate and brings said optical fiber at the lead end of said wheel-less wiring head into contact with said wiring substrate.

11. An optical fiber wiring apparatus in accordance with claim 10, wherein the predetermined pressure with which said optical fiber pressing means presses said optical fiber at said lead end of said wheel-less wiring head against said wiring substrate is within a range of $9.8 \times 10^{-2}(N)(10 \text{ gf}) - 2.0 \text{ N}(200 \text{ gf})$.

12. An optical fiber wiring apparatus in accordance with claim 1 wherein at least a part within said optical fiber path of said wheel-less wiring head which comes into contact with said optical fiber comprises a material having a lower coefficient of friction than said optical fiber.

13. An optical fiber wiring apparatus in accordance with claim 1, wherein an optical fiber cutting means for cutting said optical fiber to a predetermined length is provided.

14. An optical fiber wiring apparatus in accordance with claim 13, wherein said optical fiber cutting means is provided with:
said optical fiber path into which said optical fiber is inserted,
a cutter disposed so as to be capable of movement in a direction crossing said optical fiber path, and
an electromagnetic slider which moves said cutter instantaneously in a direction crossing said optical fiber path.

15. An optical fiber wiring apparatus in accordance with claim 1, wherein said XY movement means moves said wheel-less wiring head and wiring substrate relative to one another so that said wheel-less wiring head is positioned outside said wiring substrate;

said optical fiber feed means feeds a predetermined length of said optical fiber when said wheel-less wiring head is positioned outside said wiring substrate, and by means of this, a predetermined length of optical fiber is fed outside said wiring substrate.

16. An optical fiber wiring apparatus in accordance with claim 15, wherein a table which supports said wiring substrate and which has drop holes in the vicinity of said wiring substrate support part is provided, and a predetermined length of optical fiber is fed into said drop holes of said table and a predetermined length of optical fiber is fed out outside of said wiring substrate.

17. An optical fiber wiring apparatus in accordance with claim 1, wherein said guide groove has a upwardly deeper portion for inserting said optical fiber, so as to facilitate the insertion of the lead end of the optical fiber.

18. An optical fiber wiring apparatus in accordance with claim 1, wherein said pressure groove is formed so as to become narrower and shallower as it approaches the lead end of the wheel-less wiring head.

19. A wiring method which conducts the wiring of an optical fiber onto a wiring substrate, comprising:

adjusting the feeding of the optical fiber by an optical fiber feed means so that the tension on the optical fiber is within a fixed range;

wiring the optical fiber fed by the optical fiber feed means onto the wiring substrate by a wheel-less wiring mechanism while the optical fiber is guided along a guide groove formed in the wiring mechanism and is pressed against the wiring substrate with a predetermined pressure; and cutting the optical fiber to a required length for the wiring by an optical fiber cutting means wherein the step of wiring the optical fiber includes supporting said optical fiber with a radius of curvature larger than the radius of curvature at which said optical fiber breaks, in a state in which said optical fiber is bent by a fixed amount and is pressed onto said wiring substrate.

20. An optical fiber wiring method which employs an optical fiber wiring apparatus which is provided with a wiring substrate, a wheel-less wiring head which has a guide groove along which an optical fiber is guided, and applies the optical fiber to said wiring substrate with a predetermined pressure, and an optical fiber feed means which feeds stocked optical fiber, which apparatus moves said wiring substrate and said wheel-less wiring head relative to one another in the XY directions and conducts wiring operations which form a desired optical fiber wiring pattern on said wiring substrate, comprising;

feeding an optical fiber of predetermined length by said optical fiber feeding means, in a manner unrelated to the wiring, either before or after the wiring operation or both before and after the wiring operation, and thereby producing an optical wiring board having optical fibers of a predetermined length connected to said wiring pattern either before or after said wiring pattern by means of the wiring operation or both before and after said wiring pattern wherein the wiring operation includes supporting said optical fiber with a radius of curvature larger than the radius of curvature at which said optical fiber breaks, in a state in which said optical fiber is bent by a fixed amount and is pressed onto said wiring substrate.

21. An optical fiber wiring method which employs an optical fiber wiring apparatus which is provided with a wiring substrate, a wheel-less wiring head which is provided with an optical fiber path which guides an optical fiber to a lead end thereof and which applies said optical fiber guided to said lead end to said wiring substrate with a predetermined pressure, and an optical fiber feeding means which feeds stocked optical fiber, which apparatus moves said wiring substrate and said wheel-less wiring head relative to one another in the XY directions and conducts a wiring operation which forms a predetermined optical fiber wiring pattern on said wiring substrate, comprising:

at the initiation of wiring, moving said wheel-less wiring head to a wiring initiation position, and in the state in which said optical fiber has been guided to said lead end of said wheel-less wiring head along a guide groove formed in the wheel-less wiring head, pressing said optical fiber against said wiring substrate with said predetermined pressure, wherein said wheel-less wiring head is moved along said wiring pattern with respect to said wiring substrate, the required optical fiber is fed into said optical fiber path of said wheel-less wiring head by said optical fiber feeding means, and wiring is conducted; and wherein the step of pressing the optical fiber against said wiring substrate includes supporting said optical fiber with a radius of curvature at which said optical fiber breaks, in a state in which said optical fiber is bent by a fixed amount and is pressed onto said wiring substrate.

22. An optical fiber wiring method in which an optical fiber is laid on a wiring substrate by a wheel-less wiring head, at least a lead end of which is formed with a curved surface, which has formed in a side surface part thereof a guide groove which guides said optical fiber to said spherical surface part, and which has a pressure groove which extends from said guide groove to the bottom part of said spherical surface part, comprising;

at the initiation of wiring, moving said wheel-less wiring head to a wiring initiation position;

fitting an optical fiber into said pressure groove; pressing the optical fiber against said wiring substrate with a predetermined pressure; and moving said wheel-less wiring head along said wiring pattern with respect to said wiring substrate to thereby conduct said wiring wherein the step of pressing the optical fiber against said wiring substrate includes supporting said optical fiber via said pressure groove with a radius of curvature larger than the radius of curvature at which said optical fiber breaks, in a state which said optical fiber is bent by a fixed amount and is pressed onto said wiring substrate.

23. An optical fiber wiring method in accordance with claim 22, wherein when a wiring pattern to be wired is a curved pattern, said pressure groove of said wheel-less wiring head is oriented in a direction at tangent to said wiring pattern.

* * * * *